United States Patent [19]

Lorang et al.

[11] Patent Number: 5,548,814
[45] Date of Patent: Aug. 20, 1996

[54] PERSONAL INFORMATION MANAGEMENT SYSTEM WITH PAGING LINK

[75] Inventors: Malcolm M. Lorang; Roger D. Lindquist, both of Dallas, Tex.

[73] Assignee: Motorola, Inc., Schaumburg, Ill.

[21] Appl. No.: 967,451

[22] Filed: Oct. 28, 1992

Related U.S. Application Data

[63] Continuation-in-part of Ser. No. 661,079, Feb. 25, 1991, and a continuation-in-part of Ser. No. 661,078, Feb. 25, 1991.

[51] Int. Cl.$^6$ .................................... H04B 7/00
[52] U.S. Cl. .................. 455/38.1; 455/54.1; 455/56.1; 340/825.44
[58] Field of Search .................... 455/56.1, 33.1, 455/33.4, 38.1, 38.2, 38.4, 51.1, 51.2, 57.1, 54.1, 54.2; 340/825.44, 825.49, 825.54

[56] References Cited

U.S. PATENT DOCUMENTS

| H610 | 3/1989 | Focarile et al. | 379/60 |
|---|---|---|---|
| 3,995,111 | 11/1976 | Tsuji et al. | 375/358 |
| 4,398,192 | 8/1983 | Moore et al. | 340/825.44 |
| 4,670,905 | 6/1987 | Sandvos et al. | 455/33.4 |
| 4,745,599 | 5/1988 | Raychaudhuri | 370/93 |
| 4,747,120 | 5/1988 | Foley | 379/38 |
| 4,747,122 | 5/1988 | Bhagat et al. | 379/57 |
| 4,811,376 | 3/1989 | Davis et al. | 379/57 |
| 4,829,554 | 5/1989 | Barnes et al. | 379/58 |
| 4,918,437 | 4/1990 | Jasinski et al. | 340/825.44 |
| 4,943,803 | 7/1990 | Vrijakorte | 340/825.49 |
| 4,968,966 | 4/1990 | Jasinski et al. | 340/825.44 |
| 5,047,763 | 9/1991 | Kuznicki et al. | 340/825.44 |

FOREIGN PATENT DOCUMENTS

| 31757/84 | 2/1984 | Australia . |
| 0167458 | 7/1985 | European Pat. Off. . |
| 0167458 | 8/1986 | European Pat. Off. . |
| 0281150 | 9/1988 | European Pat. Off. . |
| WO84/00868 | 3/1984 | WIPO . |
| WO85/05240 | 11/1985 | WIPO . |
| WO87/00994 | 6/1986 | WIPO . |
| WO87/01005 | 2/1987 | WIPO . |
| WO87/00994 | 2/1987 | WIPO . |
| WO90/04314 | 4/1990 | WIPO . |
| WO91/07022 | 5/1991 | WIPO . |

OTHER PUBLICATIONS

Ritter, Stephen and McCoy, Jan, "Automatic Vehicle Location—An Overview" in *IEEE Transactions on Vehicular Technology*, vol. VT–26, No. 1, Feb. 1977, pp. 7–11.
"Unwanted Calls? Turn on Page Phone", *USA Today*, Dec. 28, 1990, p. 8B.
Gardner, W. A. and Chen, C. K., "Interference–Tolerant Time–Difference–Arrival Estimation for Modulated Signals", *IEEE Trans. on Acous, Speech and Sig. Proc.*, vol. 36, No. 9, Sep. 1988, pp. 1385–1395.
*Telocator Bulletin, News and Analysis for the Mobile Telecommunications Industry*, vol. 91, No. 3, Jun. 25, 1991.
Kihira, M., "Performance Aspects of Reference Clock Distribution for Evolving Digital Networks", *IEEE Comm. Magazine*, Apr. 1989, pp. 24–34.
Cox, D. C., "Universal Digital Portable Radio Communications," *Proc. of the IEEE*, vol. 75, No. 4, Apr. 1987, pp. 436–477.

*Primary Examiner*—Reinhard J. Eisenzopf
*Assistant Examiner*—Philip J. Sobutka
*Attorney, Agent, or Firm*—Daniel K. Nichols; John H. Moore; Philip P. Macnak

[57] ABSTRACT

A distributed data system utilizing a paging location system includes a plurality of local area networks (LAN) (38) that have a wireless data link associated therewith for accessing one of a plurality of personal data units (PDU) (10). Data transfer can be affected over a wireless link between antennas (18) and (44) by determining from an internal lookup table in each of the LANs (38) which of the LANs (38) is the homebase LAN (38). The data is then transferred to the homebase LAN (38) and the homebase LAN (38) then attempts to transfer the data to the destination PDU (10). If not located at that LAN (38), a paging message is then transferred through a paging system to all of the PDUs (10) and the destination PDU (10) then transmits a Ready-to-Receive message to the one of the LANs (38) that it is closest to. This is the receiving LAN (38) which then requests data to be transferred thereto from the homebase LAN (38) and then affects a transfer to the destination PDU (10).

10 Claims, 9 Drawing Sheets

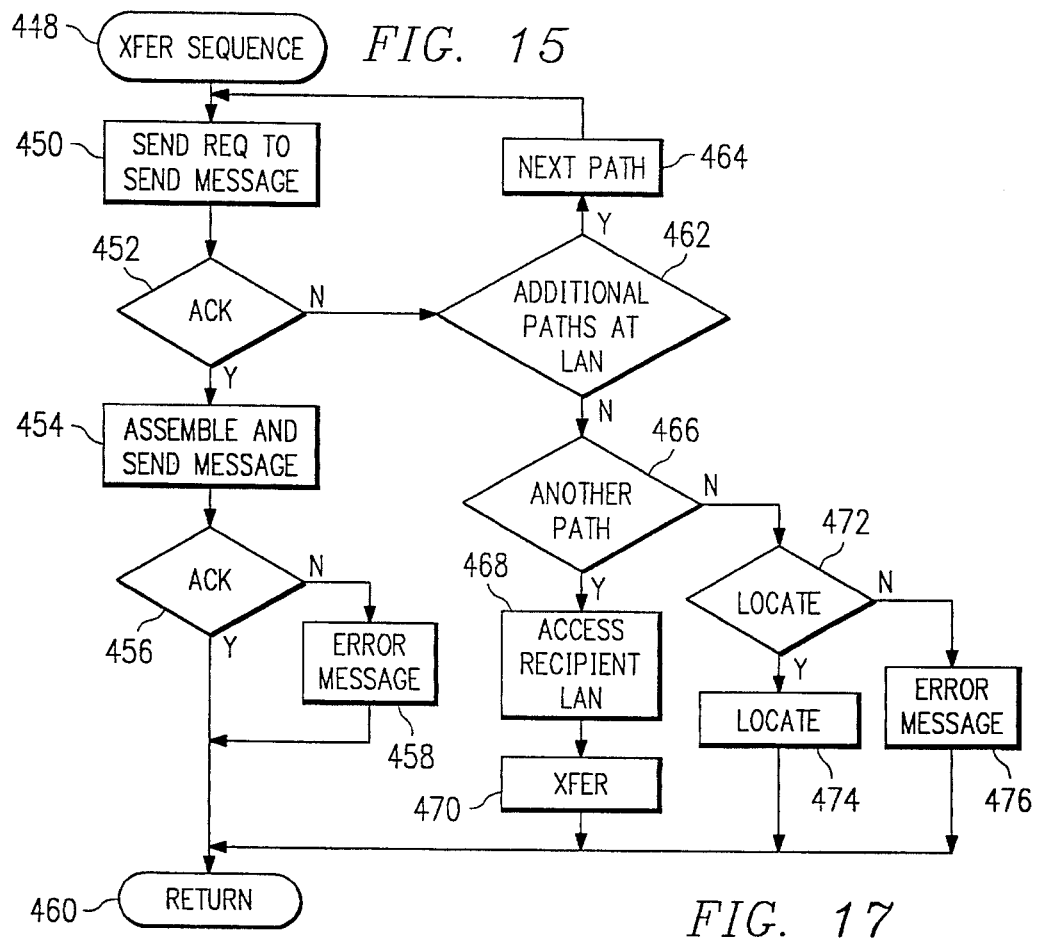
FIG. 15
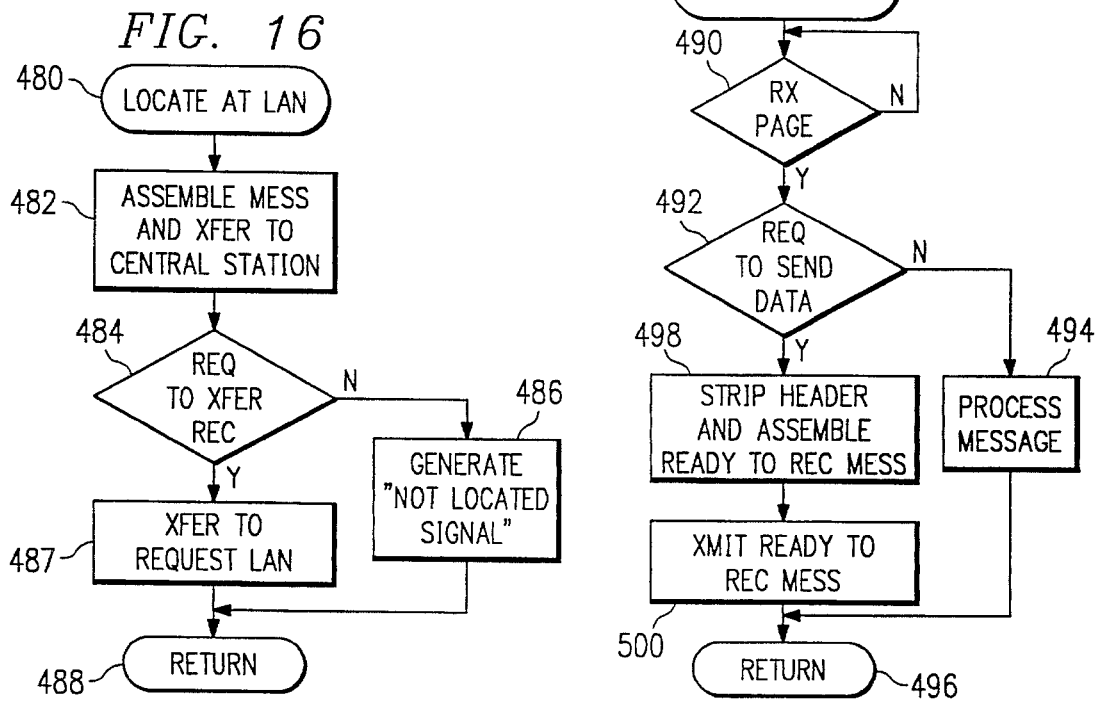
FIG. 16
FIG. 17

PERSONAL INFORMATION MANAGEMENT SYSTEM WITH PAGING LINK

CROSS-REFERENCE TO RELATED APPLICATION

The present application is related to U.S. patent application Ser. No. 07/892,194, entitled "Adaptive Communication System for Transmitting Voice/Data", filed Jun. 2, 1992, and is a continuation-in-part of U.S. patent application Ser. No. 07/661,079, filed Feb. 25, 1991, entitled "Personal Location Pager System", and a continuation-in-part of U.S. patent application Ser. No. 07/661,078, filed Feb. 25, 1991, entitled "Adaptive Paging System".

TECHNICAL FIELD OF THE INVENTION

The present invention pertains in general to a communication link for transfer of distributed information and, more particularly, a distributed message system utilizing a paging link to locate a remote receiver and initiate a data transfer operation thereto.

BACKGROUND OF THE INVENTION

Transfer of information from one location to another has conventionally taken different forms, such as transfer by voice through voice mail systems, transfer of text through facsimile systems and transfer of data through modem links. Of these, all have a common goal of transferring information from one location to another in as expedient a manner as possible. However, each of these systems has its limitations. For example, voice mail systems require a telephone link between a sender and a central mailbox location. The voice information is then stored as a voice message at the central location or mailbox, and then the recipient must call in at a later time to receive his message. With respect to facsimile locations, a phone system is again required with the message sent to a central location, i.e., the recipient's FAX machine. With respect to modems, the recipient must be at a known location and have a computer configured to receive a file which is downloaded from the sender's PC through the telephone line. Each of these systems requires that a fixed location be provided for the recipient information, thus requiring the recipient to go to that fixed location to obtain the information. Of course, cellular phone systems allow voice to be transferred in a portable manner, but this is a real-time system. In some instances, facsimile machines are associated with a cellular telephone such that the recipient can carry the FAX machine and cellular telephone in a briefcase.

One method for transferring information to individuals in an immediate manner is through use of paging systems. Paging systems allow short messages to be transmitted over paging frequencies to portable receivers which are carried on the person of the recipient. Therefore, if a message is transmitted to a recipient, the sender is reasonably assured that the message has arrived at the recipient's person. However, paging systems typically do not facilitate transfer of large text messages, graphics or the such. This is due to the fact that large amounts of information transmitted over paging systems significantly reduce throughput with messages queued up at a central station and then transmitted in a simulcast, broadcast manner to the entire paging system in a predetermined sequence. This is a serial broadcast communication system and, as such, a long message merely delays transmission of the remainder of the messages.

One of the disadvantages of transferring data over paging systems is that a single frequency is typically utilized for paging and the data is typically transferred from a central point to all of the recipient pagers at a single time. Even if the pagers can be prompted by the paging signal, it is necessary to output the information to the recipient pagers in an orderly manner. This, in and of itself, causes throughput problems due to the centralization and large spatial area broadcasting of the data.

SUMMARY OF THE INVENTION

The present invention disclosed and claimed herein comprises a method and apparatus for communicating data with portable data units. A plurality of network nodes are provided which are interconnected through a common communication link. Each of the network nodes has associated therewith a transmit/receive circuit for transmitting and receiving data over a communication link with portable data units. The transmit/receive circuit has a predetermined RF range about the associated one of the network nodes. The network node at which a recipient one of the portable data units is disposed is first located. Predetermined recipient data is then transferred to the located one of the network nodes and stored thereat. A request to transfer data is transmitted to the recipient portable data unit and, upon receiving an acknowledgement from the portable data unit, the data is then transferred thereto.

In one embodiment of the present invention, each of the portable data units has associated therewith one of the network nodes as a home station. The recipient data is first transferred to the home station network node and then the Request-to-Transfer message is transmitted to the recipient portable data unit in an attempt to transmit the stored recipient data. If an acknowledgement signal is not received from the recipient portable data unit at the home station network node, an attempt is then made to determine at which of the network nodes the portable data unit is located.

In a further embodiment of the present invention, the portable data unit is only located in the event that an acknowledgement signal is not received. To locate the recipient portable data unit, a paging message is generated defining the one of the network nodes at which the recipient data is stored, and a unique identification number associated with the recipient PDU. This paging message is transmitted out over a paging channel having an RF range that is substantially greater than the RF range associated with any of the network nodes. Upon receipt of the paging message, the recipient PDU then generates a Ready-to-Receive message having the location of the stored data encoded therein. This message is transmitted to the one of the network nodes in whose RF range the recipient PDU is disposed. The receiving network node transmits a Request-for-Data message to the home station network node and the data is then transferred to the receiving network node from the home station network node for storage thereat. The receiving network node then effects a transfer of the data to the recipient PDU.

BRIEF DESCRIPTION OF THE DRAWINGS

For a more complete understanding of the present invention and the advantages thereof, reference is now made to the following description taken in conjunction with the accompanying Drawings in which:

FIG. 11 illustrates an example of alternate data transfer techniques that can be provided for;

FIG. 15 illustrates a flowchart depicting the operation for the transfer sequence;

FIG. 16 illustrates a flowchart depicting the locate operation at the LAN;

FIG. 17 illustrates a flowchart depicting the location operation at the PDU.

DETAILED DESCRIPTION OF THE INVENTION

Figure 1:
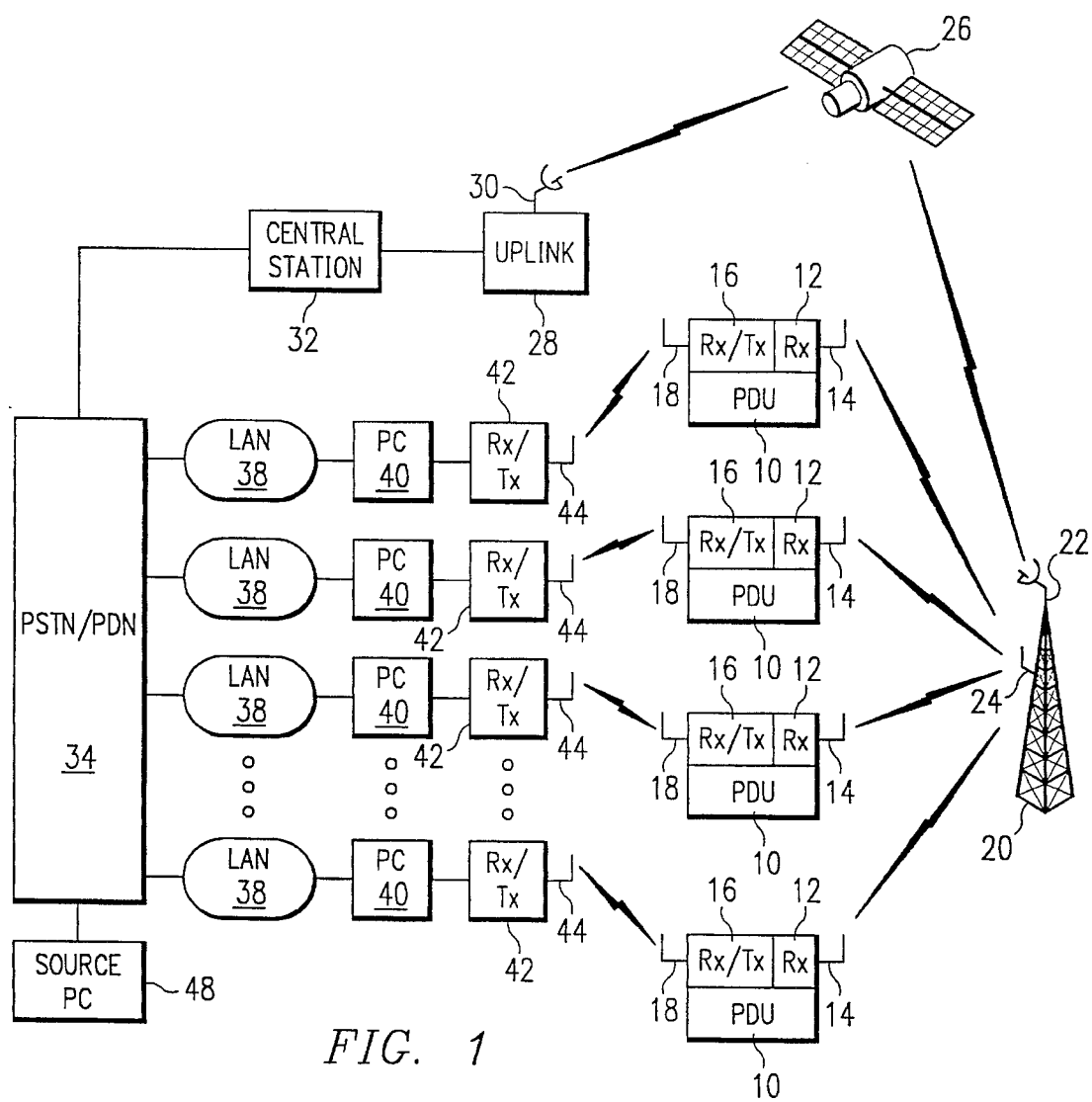
FIG. 1 illustrates an overall block diagram of the overall personal information system.

Referring now to FIG. 1, there is illustrated a system block diagram of the personal information system of the present invention. In accordance with the present invention, a plurality of Personal Data Units (PDUs) 10 are provided which can be disposed at a plurality of locations and typically are portable and maintained on or near the person of the user. Each of the PDUs 10 is operable to store data and display information and can be in the form of a Notebook Personal Computer (NBPC) or a Pen System (PS). The PS is generally a computer that allows cursive writing to be stored as an image or converted to alpha numeric text, called OCR, optical character recognition, and transmitted over a wireless link.

Each of the PDUs 10 have associated therewith a paging receiver 12, which is associated with a paging receiver antenna 14. Additionally, each of the PDUs 10 has associated therewith a Local Area Network (LAN), Receive/Transmit (Rx/Tx) adapter 16, which interfaces with an antenna 18. Each of the antennas 14 and associated receivers 12 is operable to interface with the paging system, whereas each of the antennas 18 and associated Rx/Tx 16 are operable to interface with a Local Area Network through an RF adapter to the LAN.

On the paging side, a plurality of paging sites are provided which overlap in a conventional manner, each region or area having located at substantially the center thereof a paging tower or "stick" 20. Each of the sticks 20 has associated therewith a satellite receiver 22 which is operable to interface with a satellite 26 and receive signals therefrom, and also includes a paging transmitter 24, which is operable to transmit paging messages to the antennas 14 associated with each of the PDUs 10 within the transmission region. Again, this is a conventional satellite paging system. The satellite 26 is operable to receive signals from an uplink station 28, which is connected to an uplink satellite antenna 30. The uplink 28 receives information from a central paging station 32, which is connected to a Public Switch Telephone Network/Public Data Network (PSTN/PDN).

Antenna 18 and Rx/Tx 16 provide a bi-directional communication link with one of a plurality of LANs 38. Each of the LANs 38 has associated therewith a processor or Personal Computer (PC) 40 that is operable to execute instructions and interface with a wireless LAN adapter Rx/Tx device 42. Each of the Rx/Tx devices 42 associated with the wireless LAN adapter has associated therewith an antenna 44, the antenna 44 operable to transmit and receive information over the communication link with the Rx/Tx 16 of the PDUs 10 when the PDUs 10 are within the transmission range of the specific Rx/Tx device 42. Each of the LANs 38 in turn are connected to the PSTN/PDN. (The PC can also be a wireless LAN adapter card that is inserted into the LAN Server.)

In operation, information can be transmitted to each of the PDUs 10 over the communication link between antennas 44 and antenna 18 for the associated one of the LANs 38. This information can be originated at one of the PDUs 10 for delivery to another of the PDUs 10, or it can be originated at a Source Personal Computer (PC) 48, which is connected through a modem to the PSTN/PDN 34 or one of the LAN clients. Each of the PDUs 10 has a unique ID or address on the system and is associated with one of the LANs 38, since the associated LAN 38 will define the expected region of a given one of the PDUs 10. However, each of the PDUs 10 is portable and can therefore be moved from one region associated with one of the LANs 38 to another region associated with another of the LANs 38. As will be described hereinbelow, the transmission range of each of the antennas 40 and associated wireless LAN adapters does not overlap. They generally define a specific locale such as a building or a given site.

In order to transmit a message to one of the PDUs 10, each of the LANs 38 has stored therein a lookup table. This lookup table contains the addresses of all of the PDUs 10 in the system and the associated one of the LANs 38. Alternately, each LAN 38 has a table of all routing information and need only receive the address from the PDU 10.

If a message were originated at the Source PC 48, the Source PC 48 would have associated therewith a lookup table similar to the ones in the LANs 38 in order to determine which of the LANs 38 was the "homebase" of the recipient PDU 10. Alternately, the source PC will contact one of the LANs 38 and obtain "homebase" information. The data or information to be forwarded to the PDU 10 would then be assembled with a header or routing information that defines the address or ID of the recipient PDU 10 and the method of delivery, i.e., whether the message is to be delivered immediately or at a later time, and possibly path over which the data or message is to be delivered. This information is then transmitted to the homebase LAN 38 and stored in its database. The LAN 38 or the homebase LAN 38 then attempts to locate the PDU within its range by sending out a polling request to the recipient PDU 10 in the form of a Ready-to-Transmit message. Of course, all of the PDUs 10 within the transmission range of the associated antenna 44 and Rx/Tx device 42 will receive the information. However, only the one of the PDUs 10 recognizing the transmitted address as the associated unique address or ID will respond with an acknowledgement signal in the form of a Ready-to-Receive message. Once the LAN 38 has received the acknowledgement signal, the data is then transmitted thereto from the antenna 44 to the antenna 18.

If a LAN 38 does not receive an acknowledgement signal from the recipient PDU 10 in response to the poll the LAN 38 will then assemble a message for transmission to the PSTN/PDN 34 and subsequently to the central station 32 for retransmission as a paging message over the paging satellite 26. This message contains the address of the recipient PDU 10 and, in addition, the location of the data and the proposed method of delivery. The message will then be assembled and transmitted to the satellite 26 and then transmitted to each of the plurality of sticks 20 in the paging network. Each of the sticks 20 then formats and transmits this paging message out from the paging antenna 24 to all of the PDUs 10 within their transmission range at the specified time and frequency of the message passes Forward Error Control (FEC). Faulty data will not be transmitted, and if that base station has a return link to the central station, it can send back an ARQ. Then, the CO will repeat this process up to a defined number of retries. The PDU 10 will always receive the strongest signal, which is the reason that all of the sticks 20 must transmit at substantially the same time. Once the recipient PDU 10 recognizes its unique address, it then generates an acknowledgement message for transmission to the closest Rx/Tx device 42 and associated LAN 38. If this is not the homebase LAN, the receiving LAN 38 will then request the data from the homebase LAN 38, store the data in its data memory and then effect a data transfer to a recipient PDU 10.

In addition to utilizing the satellite link, a number of hierarchical priorities can be determined. For example, an individual may have three separate messages delivery options by which to transmit the information to the recipient. For example, each of the lookup tables could define that the information be sent over the homebase LAN 38 initially, if present otherwise, followed by forwarding to another LAN 38 and finally forwarded to another location or phone associated with a PSTN/PDN 34 through a system such as a modified CT1 phone. If all of these are unsuccessful, a fourth alternative can be utilized which allows the system to broadcast the data out over another frequency or channel without the requirement to send an acknowledgement signal back to the sending device. Each of these systems will be described hereinbelow.

Figure 2:
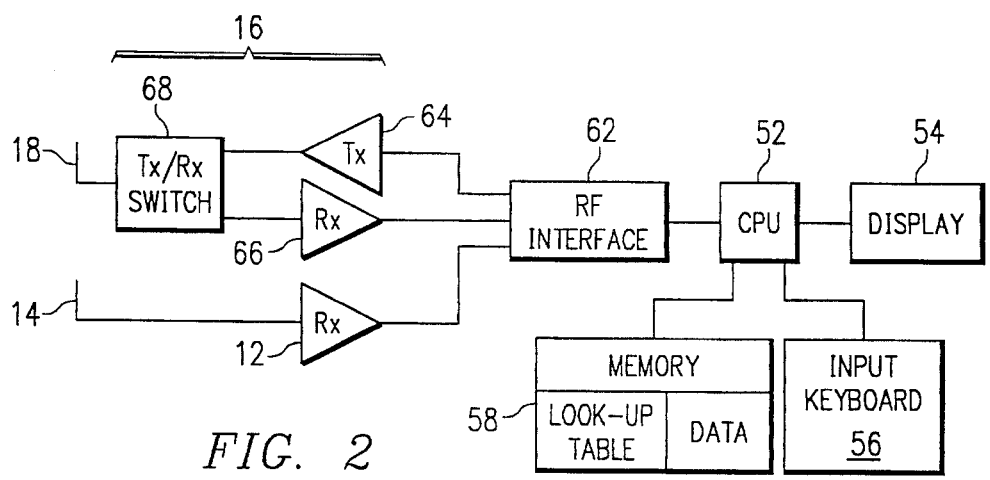
FIG. 2 illustrates a simplified block diagram of the personal data unit.

Referring now to FIG. 2, there is illustrated a simplified block diagram of the PDU 10. Each of the PDUs 10 has a Central Processing Unit (CPU) 52 disposed at the center thereat. The CPU 52 can be any type of microprocessor based system that typically includes a microprocessor, an address and data bus and the various peripheral circuitry needed to provide an input/output capability, process stored data instructions and output data or display information. The CPU 52 is interfaced with a display 54 and also an input keyboard 56. The input keyboard 56 could be any type of input, such as a standard full-size keyboard or a keypad or a penpad. The CPU 52 also interfaces with a memory 58. The memory 58 can be comprised of any combination of volatile and non-volatile memory. Typically, the memory 58 is comprised of Read Only Memory (ROM) that is operable to store data instructions for the overall operating system of the CPU 52. Volatile memory such as Dynamic Random Access Memory (DRAM) is provided for interim processing data storage. Magnetic media such as hard disks can be utilized for virtually permanent storage of data on a Read/Write basis. Additionally, there are some non-volatile RAM or ROM cards that are utilized with notebook computers.

The CPU 52 has associated therewith an RF interface 62 that allows for processing of RF data for conversion to a parallel output that can be disposed on the address and data buses associated with the CPU 52. The Rx/Tx device 16 is comprised of a transmitter 64 and a receiver 66.-A transmit/receive switch 68 is provided for being connected to the antenna 18 and also to the output of transmitter 64 and the input of receiver 66. The input of transmitter 64 is connected to one output of the RF interface 62 and the output of receiver 66 is input to the RF interface 62. Additionally, the receiver 12 is input to the RF interface 62. The transmitter 64 and receiver 66 operate on a separate frequency as compared to that of receiver 12. Therefore, receiver 12 can receive and buffer message information from the paging system at one frequency while the Tx/Rx switch 16 can communicate with the LAN over the communication link between antennas 18 and 44.

The memory 58 contains both data and a lookup table. The data is typically the data that was transmitted thereto. Further, the PDU 10 is operable to generate data locally and then transmit this data to the LAN 38. The lookup table 58 contains at least basic routing information necessary to route data to a desired location. Typically, the lookup table will contain address information of various other PDUs in the system and also contain information as to the location of the LAN 38. Whenever a PDU 10 makes a connection with the LAN 38, it has no knowledge if the LAN 38 in fact is its homebase LAN. It merely sends the data to the LAN 38 with the routing information, such as the address of the recipient. The LAN 38 then stores this locally and accesses its own lookup table to determine where the data should be transferred. The LAN 38 can then either transmit the data to the database of the homebase LAN, in the event that the receiving LAN 38 was not the homebase LAN 38, or transmit it to another location.

Figure 3:
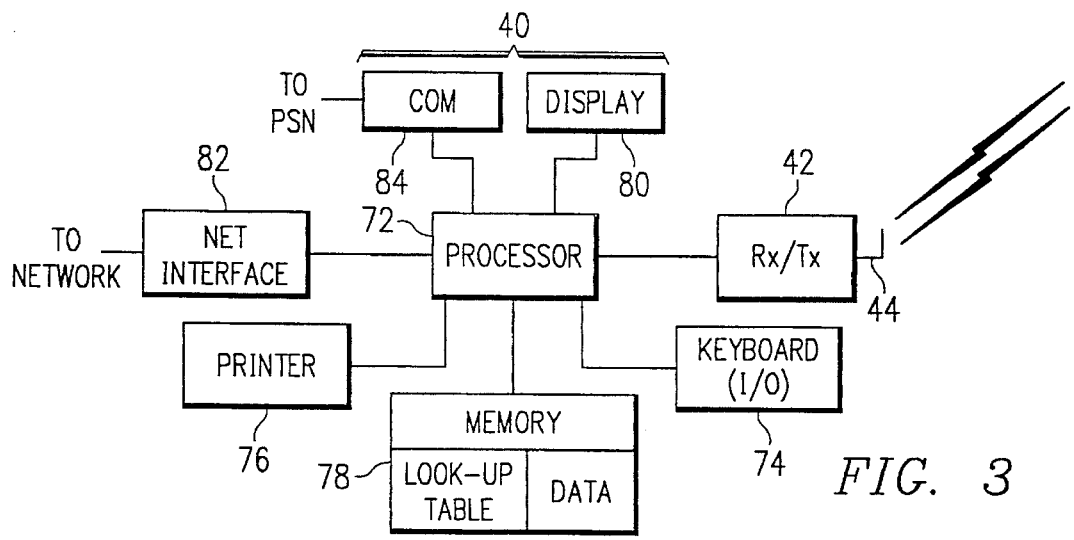
FIG. 3 illustrates a simplified block diagram of the distributed data station.

Referring now to FIG. 3, there is illustrated a simplified block diagram of a portion of the LAN 38, illustrating the use of a separate PC can be used to interface with the wireless Rx/Tx LAN adapter 42. The PC 40 is generally comprised of a processor unit 72, which processor unit 72 is generally based on a microprocessor system that utilizes a data bus and address bus to interface with various input/output devices and memory. The processor unit 72 interfaces through an I/O unit 74 to a printer 76 as an output unit. Additionally, processor unit 72 interfaces with a memory 78, the memory 78 being comprised of data and a lookup table. A display 80 is provided and the processor 72 operable to interface with the overall network through a network interface card 82.

Dependent upon the type of network utilized, the network generally comprises a plurality of processors that are operated in either a distributed mode or a centralized server-based mode. In the server-based mode, a single central processor is utilized to serve the overall network with the printer, memory and other centralized network peripheral devices. The network interface cards 82 can be based on EtherNet® interface cards on an associated type of system or other types of networks such as Novel® systems. In these types of systems, workstations are provided on a periphery of the network which access the memory at the server. However, in the system illustrated in FIG. 3, each of the network nodes on a given one of the LANs 38, there being numerous network nodes, is comprised of a relatively independent processor based system. The memory 78 represents the network memory with each of the other network nodes operable to interface through the network interface 82 to the memory 78. Therefore, the processor 72 operates as a server-based system in this mode. The processor-based unit 72 is operable to interface through a communication port with a COM circuit 84 to the PSTN/PDN 34. The COM circuit 84 is usually comprised of a modem.

In operation, the processor 72 is operable to interface with the antenna 44 with the wireless LAN adapter Rx/Tx device 42. This allows a two-way data path to the PDU 10. The memory 78 is operable to contain routing information for all devices on the system, the devices including both PDUs and LANs. For example, if a Request-to-Send message is received by the processor unit 72 from a transmitting PDU 10 to transmit data to another PDU 10 as the recipient, the processor 72 receives the Request-to-Send and then effects transfer of the data. The header associated with the data contains information regarding the address of the recipient PDU 10 and any delivery information, such as time of delivery, etc. With the address, the processor 72 can utilize the lookup table in the memory 78 to determine the routing information to the recipient PDU 10. The lookup table contains information as to which of the LANs 38 comprises the homebase LAN, and with this information, the processor 72 then transfers the data to the homebase LAN 38. Once received, the homebase LAN 38 and the processor 72 associated therewith then utilize the routing information and lookup table to determine how the information is to be routed. For example, one routing scheme could be to first attempt to transfer the data to the PDU 10 over the wireless link between the antennas 44 and 18. This would require sending out a Request-to-Send data with the address of the recipient PDU 10 and then waiting for an acknowledgement signal. If an acknowledgement signal is received, the data is then transferred with an acknowledgement signal received at the end of the data transfer. If, however, an acknowledgement signal was not received, the processor 72 would then go to the next hierarchical level of the routing structure which could be, for example, a home phone and then possibly an office phone. Of course, when the office or home phone were reached, a data interface would be required in order to allow data to be transferred.

If the routing scheme in the routing table were not successful in routing the data to the recipient PDU 10, processor 72 would then transfer a request for location to the central station 32, which would then queue a request message in the uplink 28 and transmit this to the satellite 26 for transmission to the various sticks 20. The paging system would then transmit this Request-for-Location packet message to all of the PDUs 10 in the system through the paging receiver 12 and antennas 14 on each of the PDUs 10. When the recipient PDU 10 had received this Request-for-Location message, it would then attempt to contact the nearest LAN 38 by transmitting an Ready-to-Receive message to the antenna 44 and associated Rx/Tx circuit 42. The one of the processor units 72 and associated LANs 38 receiving this Ready-to-Receive message would recognize the Ready-to-Receive message as containing the address of the LAN 38 having the data to be transferred. The processor unit 72 would then initiate a request for the data back to the originating one of the processors 72 and the data would then be transmitted from the originating processor to the one receiving the Ready-to-Receive message from the PDU 10. The processor 72 associated with the request PDU 10 would then effect a transfer of data from its memory 78 to the recipient PDU 10.

Figure 4:
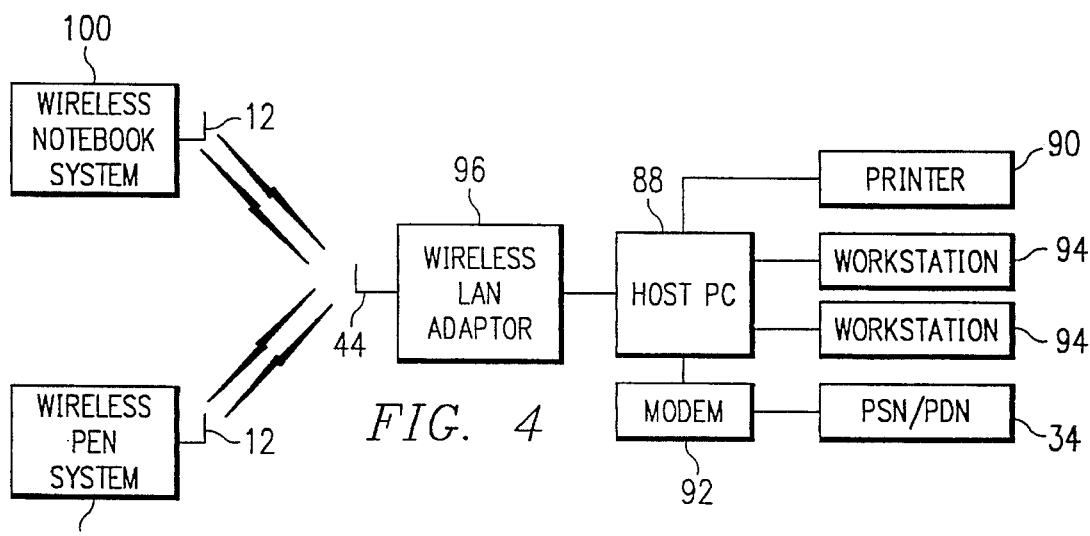
FIG. 4 illustrates a detail of the LAN.

Referring now to FIG. 4, there is illustrated a detail of the LAN 38. A host PC 88 is provided which provides the server operation that is connected to a printer 90 and also to a modem 92 to allow connection to the PSTN/PDN 34. Various workstations 94 are provided and associated with the host PC 88. The host PC 88 has associated therewith a single wireless LAN adapter 96 which provides the function of the Rx/Tx circuit 42 to transmit information over the path between the antenna 44 and the antennas 18. The antennas 18 are associated with two personal data units, a wireless notebook system 100 and a wireless pen system 102. The wireless notebook system 100 is essentially a notebook computer that has associated therewith an Rx/Tx circuit 16. The wireless pen system 102 similarly contains the Rx/Tx circuit 16 and is operable to have associated therewith a pen tablet for allowing cursive script to be input thereto as a data file. This data file can then be transferred to the network. Further, a data file having an image associated therewith can be transferred to the wireless pen system 102 for display thereat.

Figure 5:
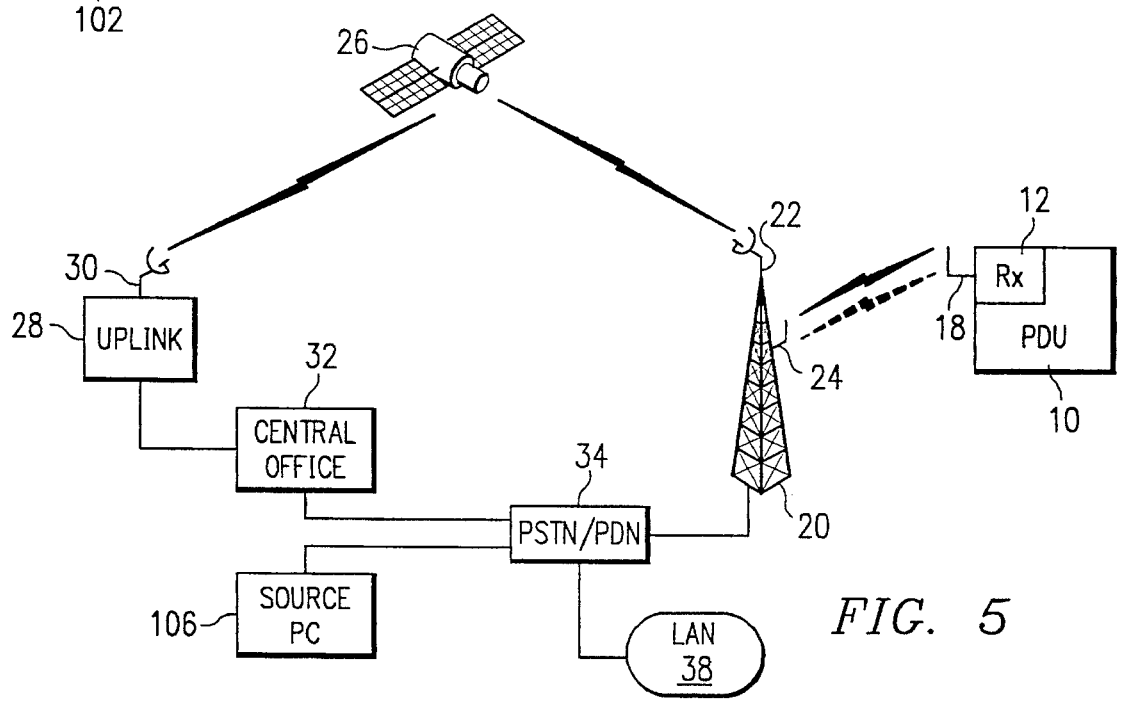
FIG. 5 illustrates a simplified block diagram of an embodiment of the personal information message system wherein information is downloaded on a default path.

In FIG. 5, there is illustrated one embodiment of the present invention, illustrating an alternate routing mechanism which is selectable whenever the PDU 10 is outside the range of the antenna 44 associated with any of the LANs 38. As will be described hereinbelow, there is only a limited range for each of the LANs 38 and the associated wireless adapter. The range of the paging system antennas, on the other hand, is much larger. Whenever the routing scheme results in an inability to locate the PDU 10 by transmitting an acknowledgement signal to one of the LANs 38 indicating that it is within its transmission range, an alternate path for data delivery can be chosen. This would comprise part of the routing scheme stored in the lookup tables associated with each of the LANs 38.

In the scheme illustrated in FIG. 5, a Source PC 106 is connected external to the system and is interfaced with the system through the PSTN/PDN 34. Information is transmitted from the Source PC 106 to the homebase LAN 38 in accordance with information stored in the lookup table in the source PC 106. The LAN 38, this being homebase LAN, goes through the routing table and determines that the PDU 10 is not within the RF range of any of the LANs 38. Additionally, the other routing schemes that allow a Ready-to-Receive message to be received over a two-way communication path also are determined to be an available. When this occurs, data delivery can occur along a different path. The alternate path requires a message to be transmitted to the central office 32 to send a Request-to-Transmit data message on an alternate path to the PDU 10 across the paging system. This is transmitted to all of the sticks 20 and sent out on the paging frequency to the receivers 12 on all of the PDUs 10. The recipient PDU 10 recognizes this message and then places itself in a data receive mode which allows reception of data on a different or alternate path. This different or alternate path could be FDM, CMD or TDM, for example, with a different frequency or code that is dedicated to data reception. This is typically required, since the paging system would experience a considerable decrease in throughput if data were transmitted on the main paging channel. By providing separate data channels, data can be transmitted at different times. For example, multi-frequency receivers can be provided on the PDU 10 in addition to multiple transmitters at the stick 20. During data transmission, the data is transferred from the LAN 38 through the PSTN/PDN 34 to the central office 32. The central office 32 then effects the data transfer to each of the sticks 20 in the system for broadcast out through the separate data channel, as represented by the dotted line, to the PDU 10. Of course, this transmission is a "blind" transmission such that there is no acknowledgement that the data was received. However, this is an alternative that must be accepted by the owner of the recipient PDU 10. The owner of the PDU 10 must rely upon the integrity of the transmission data channel and assume that this will result in reception of the data in the event that the system routing paths allowing for acknowledgement are unavailable for the transfer operation.

Figure 6:
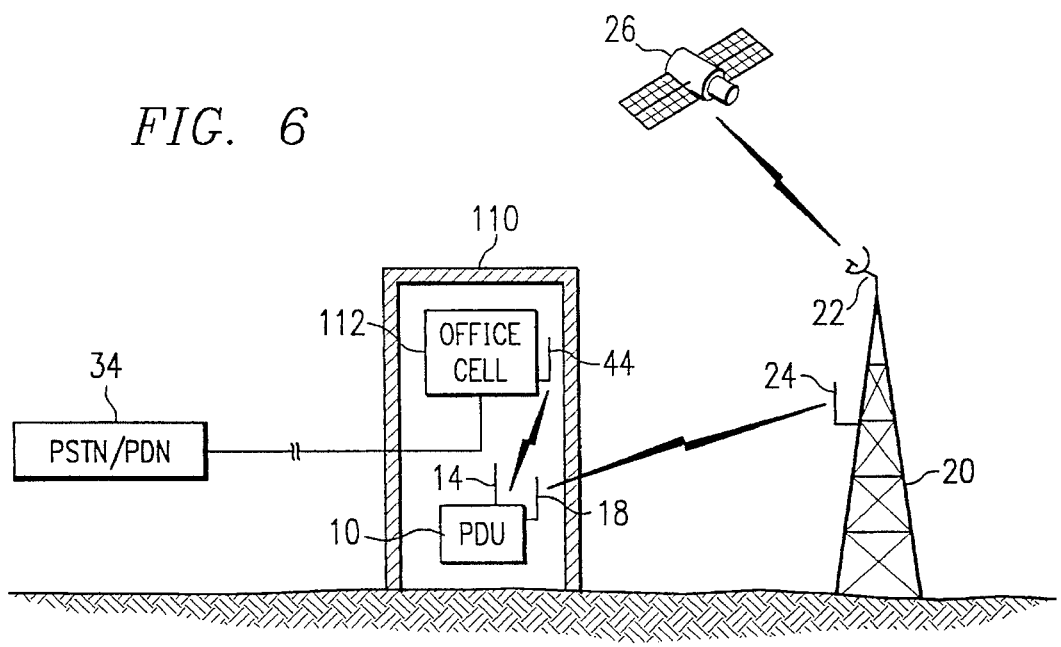
FIG. 6 illustrates a diagrammatic view of an office cell utilized in conjunction with the personal data unit.

Referring now to FIG. 6, there is illustrated an embodiment of one of the locations of a LAN 38 and associated PC 40, Rx/Tx device 42 and antenna 44. The stick 20 is illustrated as disposed adjacent a building 110. The building has disposed therein an office cell 112, which comprises the LAN 38 and operates on a private or non-public group of channels, or Part 15. Therefore, each of the office cells 112 has associated therewith a particular group of channels that is different from the channels of overlapping geographic stations. In operation, a PDU 10 is provided that is within the transmit/receive range of the office cell 112, the office cell 112 typically operating on a high data rate. When the location request message is transmitted to the stick 20, the transmitter associated with the stick 20 is then operable to transmit a location request from the antenna 24 to the PDU 10 on the polling channel. The information transmitted in this message is at a minimum the Recipient Identification Number (RIN) and location of data.

Figure 7:
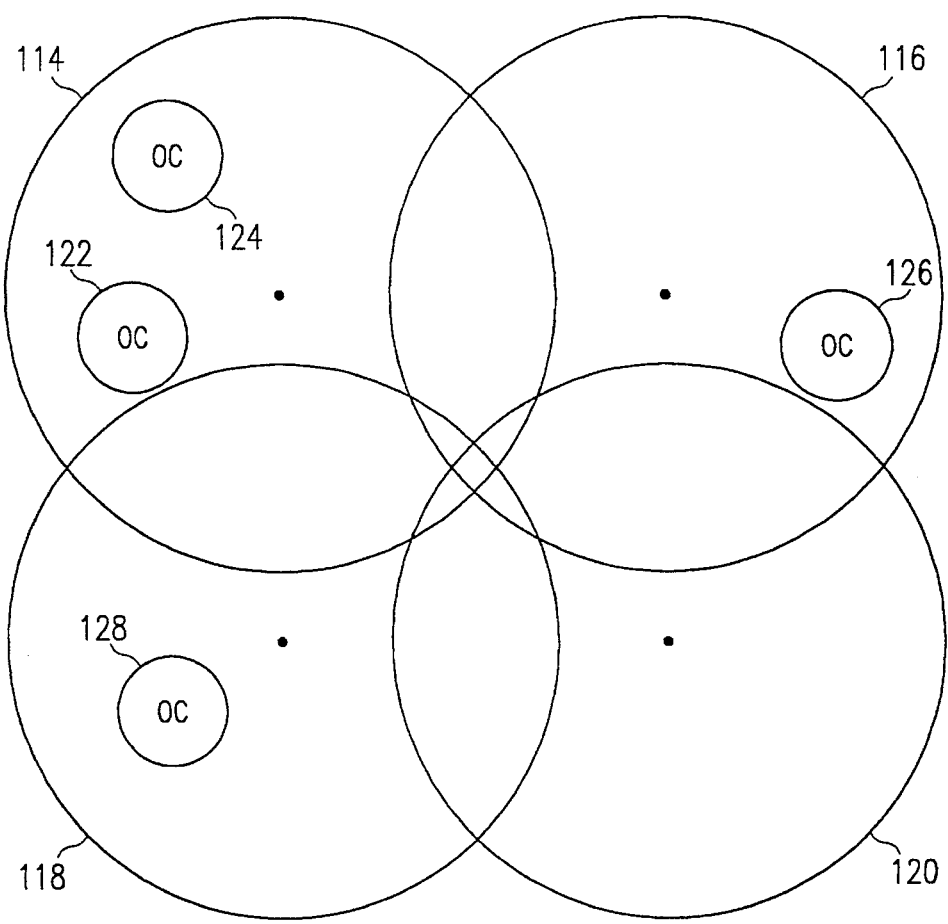
FIG. 7 illustrates a cell layout for the coverage area for multiple paging sites.

Referring now to FIG. 7, there is illustrated a diagrammatic view of four cells defined by four separate RF patterns 114, 116, 118 and 120. Each of the RF patterns 114-120 represent the receiving range from a transmitter located at the center thereof over which one of the PDUs 10 would adequately receive sufficient signal to extract data therefrom. Within each of the RF patterns 114-120, there can be located one or more office cells 112, each having an RF pattern associated therewith. For example, RF pattern 114, has two office cells 122 and 124 associated therewith, one office cell 126 associated with RF pattern 116 and one office cell pattern 128 associated with RF pattern 118. It can be seen that the RF patterns of the office cells are smaller than the associated RF patterns 114-120. This is due to the fact that the RF patterns 114-120 are associated with high power low data rate transmissions and the transmission associated with the office cell pattern 122-128 are at a low power and higher data rate. The paging channel would cover the entire RF pattern 114 whereas the PDU 10, if it were located in the RF pattern 124, would then communicate with the office cell associated with the RF pattern 124 to obtain data therefrom.

Figure 8:
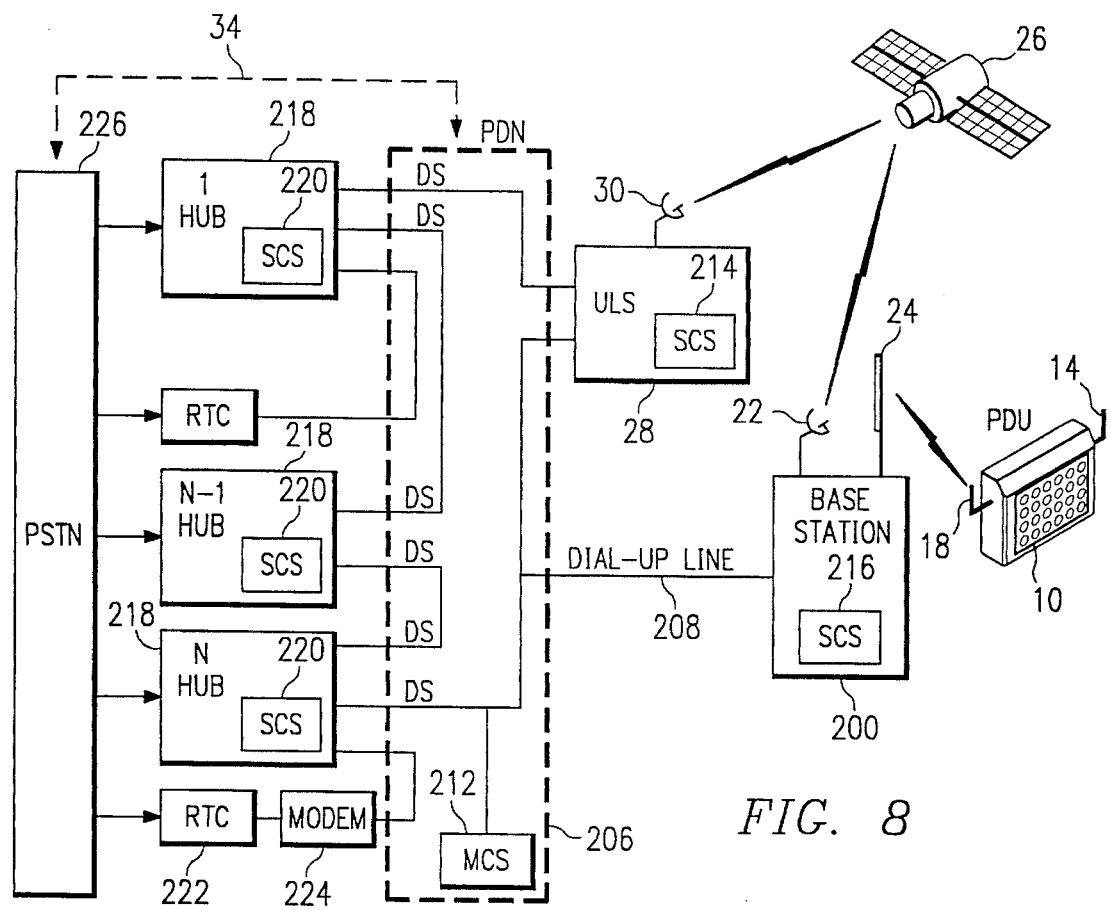
FIG. 8 illustrates the associated paging system.

Referring now to FIG. 8, there is illustrated the associated paging system block diagram with a base station at one of the sticks 200 and its associated PDU 10. Each of the sticks has associated therewith a base station 200 that in general includes a satellite receiver for receiving information on the satellite receiving antenna 22. The base station has associated therewith the paging antenna 24. The request information is transmitted out through the antenna 24 to the PLU 10.

The base station 200 is connected to the PSTN/PDN 34 through phone fines 208 which allow for transmission of digital data through a data network 206. Data network 206 includes a master clock signal (MCS) 212, which is normally generated by the telephone company, and maintained at a very accurate phase and frequency with minimal drift. This clock is utilized by the uplink 28 through a Slave Clock System (SCS) 214, and the base station 200 also locks up to this clock through an SCS 216. The SCS 216 may be linked to the MCS via a 56 k-bit line or through the data clock from the satellite receiver. This provides a very stable dock reference for all of the base stations 200.

The PSTN/PDN 228 is interfaced with a number of hubs 218 at different locations. Each of the hubs 218 is locked up to the MCS 212 through an SCS 220. They are also interconnected to each other through the PDN 206 and also to the uplink 28 through the PDN 206. In addition, a remote trunk concentrator (RTC) 222 is provided that interfaces with the PSTN 226 through a modem 224, this being a conventional part of a paging system. All of the hubs 218-220 and the RTC 222 interface with the analog portion of the telephone network, the public switch network (PSN), which PSN 228 and PDN 206 are interconnected, as indicated by a dashed line 128.

Figure 9:
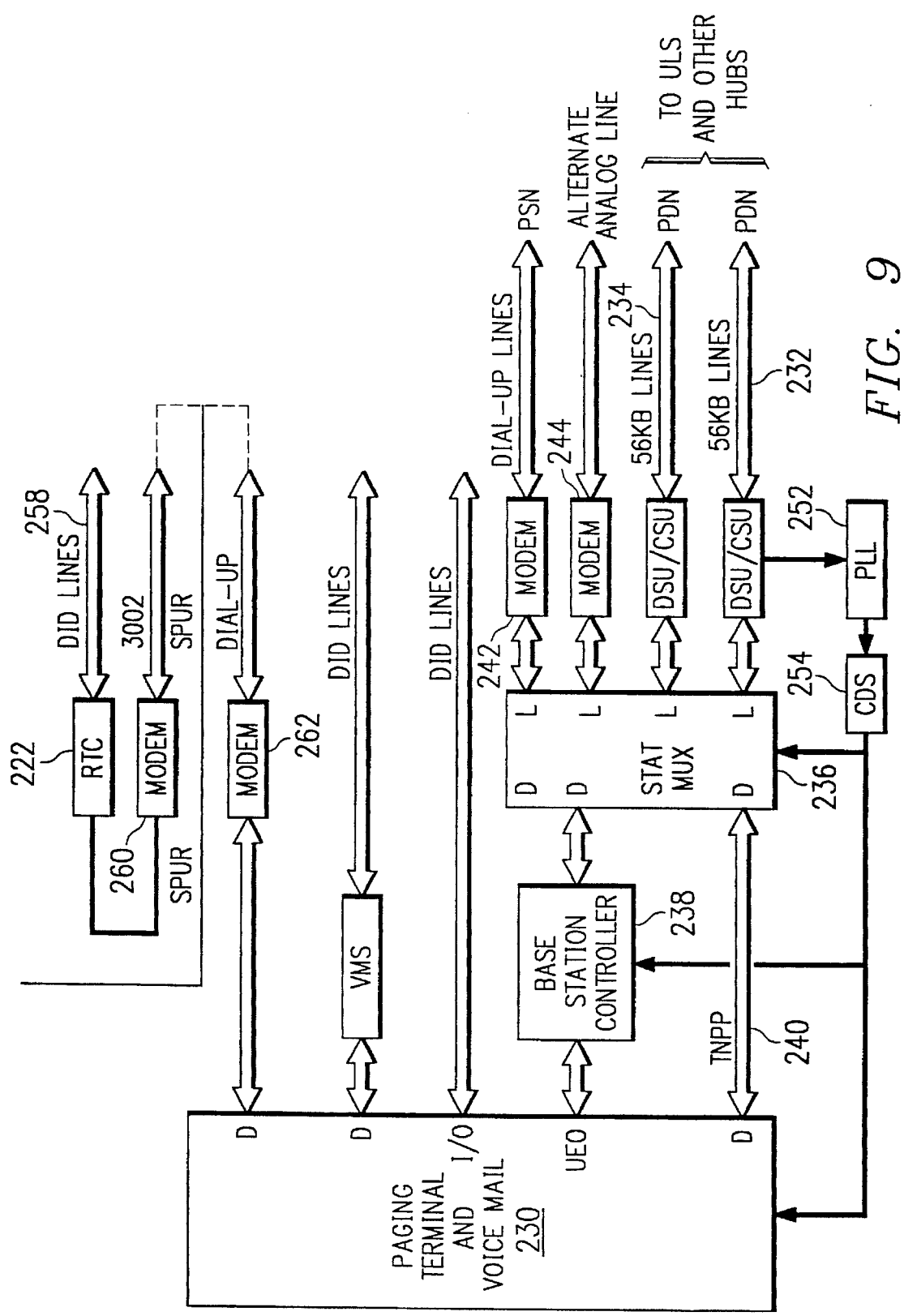
FIG. 9 illustrates a detailed logic diagram of the central office.

Referring now to FIG. 9, there is illustrated a block diagram of a conventional hub and illustrating a spur. The hub in general is comprised of a paging terminal 230 which, in the preferred embodiment, is a Glenayre 3000 XL, manufactured by Glenayre Corporation. This is a fairly conventional paging terminal and is utilized by paging systems. The hub is interconnected with the uplink systems through the PSTN/PDN 34 via a primary 56-kilobit telephone line 232 and a secondary 56-kilobit telephone line 234. These lines are operable to connect to a multiplexer 236, which is input to both the paging terminal 230 through a base station controller 238 or directly through a TNPP line 240, which TNPP line provides for paging terminals to communicate with each other. The base station controller 238 is operable to assemble the data and implement the command and control functions for transmission out to the uplink system 28 and subsequently to the base station 200 through the satellite 26. The base station controller is an N1450, manufactured by Motorola. In addition, there are a number of dial-up lines which are received from the PSN 34 through a modem 242 with alternate lines provided connected through a modem 244. Also, the base station controller may be located at the uplink 28 and this controller can be the complex NCU, manufactured by Complex Corporation, or any other controller, including Quintron/Glenayre, and MicroLink.

A phase lock loop (PLL) 252 is provided for linking to the master clock signal which is on the 56-kilobit lines 232 and 234. This comprises the SCS 220. The PLL 252 has a clock that is output to a clock distribution system (CDS) 254, which is utilized by the base station controller 238 and also by the paging terminal 230. The clock distribution is well-known, and is described, generally, in Masami Kihara, "Performance Aspects of Reference Clock Distribution for Evolving Digital Networks", IEEE Communications Magazine, April 1989, pp. 24–34. In addition, the RTC 222 provides the interface with the spur hubs through the telephone lines 258 and a modem 260. The spur interfaces with another modem 262 at the location of the hub for interface with the paging terminal 230.

Figure 10:
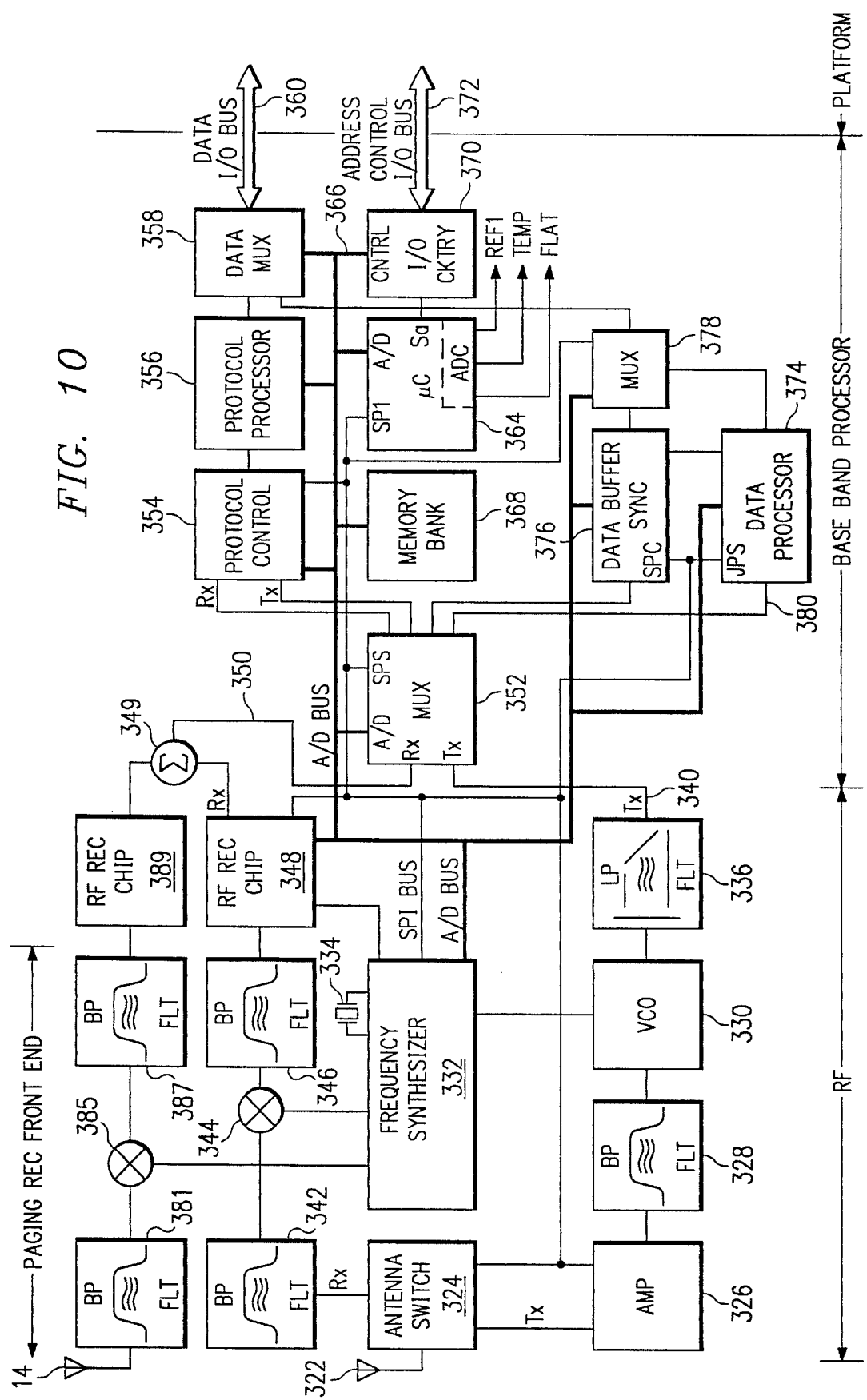
FIG. 10 illustrates a block diagram of the Rx/Tx portion of the PDU.

Referring now to FIG. 10, there is illustrated a block diagram of the Rx/Tx portion of the PDU 10. In general, the PDU 10 incorporates the general structure of the CT2/CAI compatible personal telephone manufactured by Motorola under the trademark "SILVERLINK 2000". It utilizes a time division duplex (TDD) technique to provide full duplex communications along a single channel, and is operable to facilitate automatic communications on one of many radio channels to meet regulations. Also, direct sequence Code Division Multiplex or standard FM Architecture, are candidate solutions for the low power two-way link. The one-way paging RF link is standard paging FM architecture.

An antenna 322 is provided that is connected to the output of an Rx/Tx antenna switch 324. The Tx side of the switch 324 is connected to the output of an amplifier 326 that operates over the band of interest and at two power levels, a low power level of 5–50 milliwatts. The transmitter used for wireless LAN communication. The input to the amplifier is connected to a band-pass filter 328, which filters the output of a voltage controlled oscillator (VCO) 330. The VCO 330 is controlled by a frequency synthesizer 332 that is controlled by a crystal 334. The frequency synthesizer is tuneable to allow control of the VCO 330 over the band of interest. The modulation input to the VCO 330 is connected to the output of a low-pass filter 336, which receives data on a Tx line 340.

The Rx output of the switch 324 is connected to the input of a band-pass filter 342 which has a band-pass filter response over the frequency of interest. The output of the filter 342 is connected to the input of a down converter 344, which has the local oscillator input thereof connected to the output of the frequency synthesizer 332. The output of the down converter 344 is connected to the input of an intermediate band-pass filter 346, the output of which is connected to a receiver chip 348, this being a conventional receiver chip used by Motorola and referred to as a ZIF receiver for "Zero IF" receiver. The output of the receiver chip 348 is input to a summer 539, the output of which is placed onto an Rx line 350.

The Tx bus 340 and the Rx bus 350 are connected to a multiplexer 352, such that the multiplexer 352 can, during a receive operation, receive data from the Rx bus 350 and, during a transmit operation, output data to the Tx bus 340. The multiplexer 352 interfaces with either a high data rate section or a low data rate section. The high data rate section is comprised of a Protocol Control Circuit 354 that is connected to a Protocol processor 356 to process the time division duplex data. Typically, this is comprised of the data link layer protocol processor with a bypass for voice. The output of the processor 356 is typically digital data, which is connected to a data multiplex and I/O circuit 358 for interface with a data I/O bus 360. The data I/O bus 360 can also be interfaced with circuitry to allow the data I/O bus to interface with an ADPCM transcoder chip and then the PCM chip, and then interface amplifiers to the speaker and microphone input to allow two-way voice data to be transmitted. The circuit 358 is operable in a multiplex mode to operate in a real time mode or in a batch mode and, therefore, has two inputs, one connected to the processor 356 for the real time mode and one connected to a batch processor (non-real time).

A microcontroller 364 is provided that is interfaced with an address/data (A/D) bus 366 that interfaces with the Protocol Control 354, the processor 356 and the data multiplexer and I/O circuit 358. Additionally, it interfaces with the multiplexer 352, the RF receiver chip 348 and the frequency synthesizer 332. A memory bank 368 is provided and is comprised of both volatile and non-volatile memory and is interfaced with the A/D bus 366. A control I/O circuit 370 is also interfaced with the A/D bus 366 and with the microcontroller 564 though an address control I/O bus 572. The control I/O circuitry is operable to transfer external control signals and interface these control signals with the microcontroller 364.

The buffered data portion for the batch processor is comprised of a data processor 374 and a data buffer 376. The data processor is operable to receive data from or transfer data to the multiplexer 352. The multiplexer 378 is operable during a receive operation to transmit the output of the data processor 374 to the input of the data multiplexer and I/O circuit 358. In another operation, the multiplexer 378 can select the output of the data buffer for connection to the data buffer and I/O circuit 358. In a transmit operation, the data processor 374 implements the majority of the OSI data link layer functions, such as link protocol, for the data that is directly input to the multiplexer 352 or input to data buffer 376 for input to the multiplexer 352. The data buffer 376 is basically a part of the memory bank 368, but is illustrated as being a separate circuit for simplification purposes. Both the data buffer 376 and data processor 374 are connected to the A/D bus and also to a serial control bus 380. The serial control bus 380 is connected to the serial port interface from the microcontroller 364, which bus is also connected to the Protocol Converter 354, multiplexers 352 and 378, data buffer 376, data processor 374, receiver 348 and a frequency synthesizer 332. This allows the microcontroller 364 to interact set parameters with the various circuitry during the operation thereof.

The antenna switch 324 and the receiving section comprised of filters 542 and 546 and the transmitter section comprised of VCO 330 all comprise the Rx/Tx section 16, the antenna 322 corresponds to the antenna 18. This operates over the channel associated with the wireless LAN adapter depicted by the Rx/Tx device 42 in FIG. 1. The remaining portion of the circuitry from the multiplexer 352 to the I/O circuitry 370 and data multiplexer 358 all comprise a base band process. Additionally, a paging front end receiver is provided which is comprised of the antenna 14 to the input of a bandpass filter 381. The output of this is input to a mixer 385, which is controlled by the output of the frequency synthesizer, this providing a local oscillator input. The output of the mixer 385 is a downconverted output which output provides an intermediate frequency that is input to a bandpass filter 387 which is similar to the bandpass filter 346. The output of bandpass filter 387 is input to an RF receiver chip similar to the RF receiver chip 348. The output of the RF receiver chip 389 is input to the summer 349. In general, the output of RF receiver chip 389 comprises a receive signal formatted with POCSAG paging format. This is processed in a conventional manner to retrieve the information associated therewith. In general, the circuit of FIG. 10 comprises an overall transceiver module that is utilized to receive information from a paging system and to interface with a wireless LAN adapter over a separate frequency.

Figure 11:
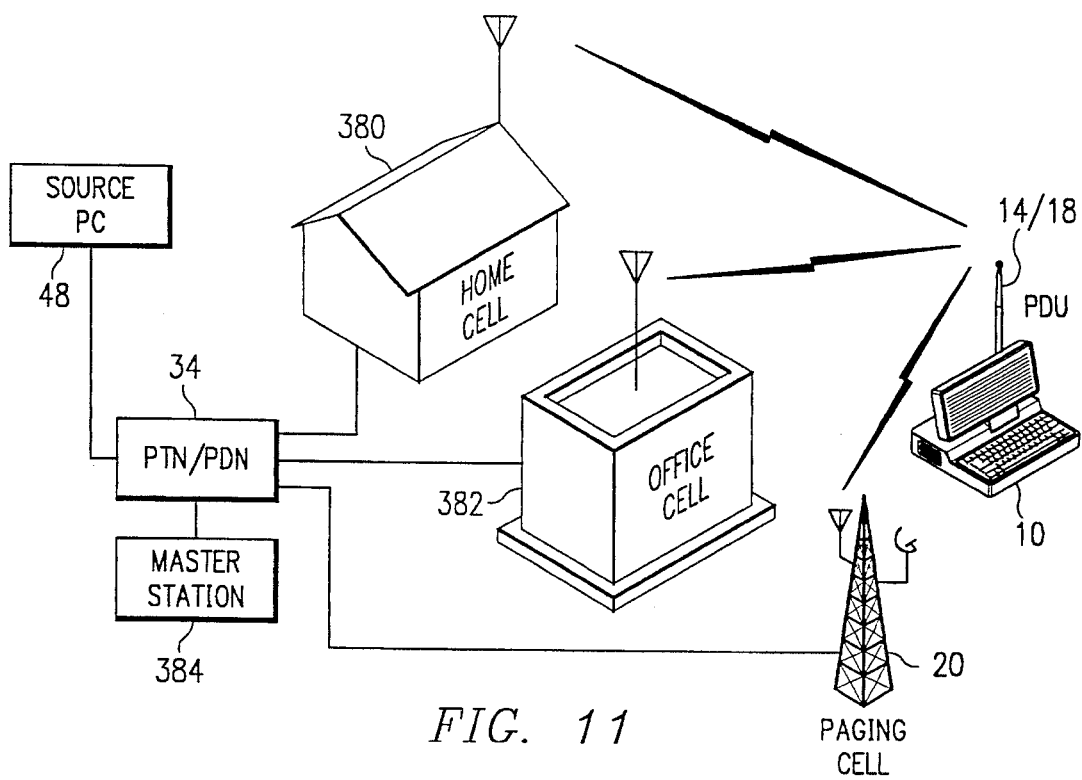

Referring now to FIG. 11, there is illustrated an example of alternate data transfer techniques that can be provided. The PDU 10 can communicate with the paging stick 20 or it can communicate with one of the office cells, there being illustrated an office cell 382 and office cell 380, the office cell 380 defined as a "home" cell 380. The home cell 380 and the office cell 382 are all connected through the PSTN/PDN 34 to the source PC 48. If the source PC 48 desires to contact the recipient PDU 10 and transfer data thereto, the data will first be transferred to the office cell 382 by the source PC 48. The office cell 382 will then attempt to contact the PDU 10 in its RF range. If this is not possible, then the data will be transferred to the home cell 380 and data transfer attempted therefrom. If the home cell 380 determines that it cannot transfer the data therefrom, it then transfers the data to a master station 384 which is similar to the central station 32 and is operable to queue the data up and transfer it to the stick 20 for transfer of the data out to the recipient PDU 10, this being a transmission path that has no acknowledgement path back. Therefore, the data is merely dumped to the PDU 10. This occurs whenever the recipient PDU 10 is outside the RF range of either of the home cell 380 or the office cell 382, it being noted hereinabove that the RF range of the home cell 380 and office cell 382 are much smaller than that of the stick 20. Additionally, there are numerous sticks 20 having overlapping RF ranges.

Figure 12:
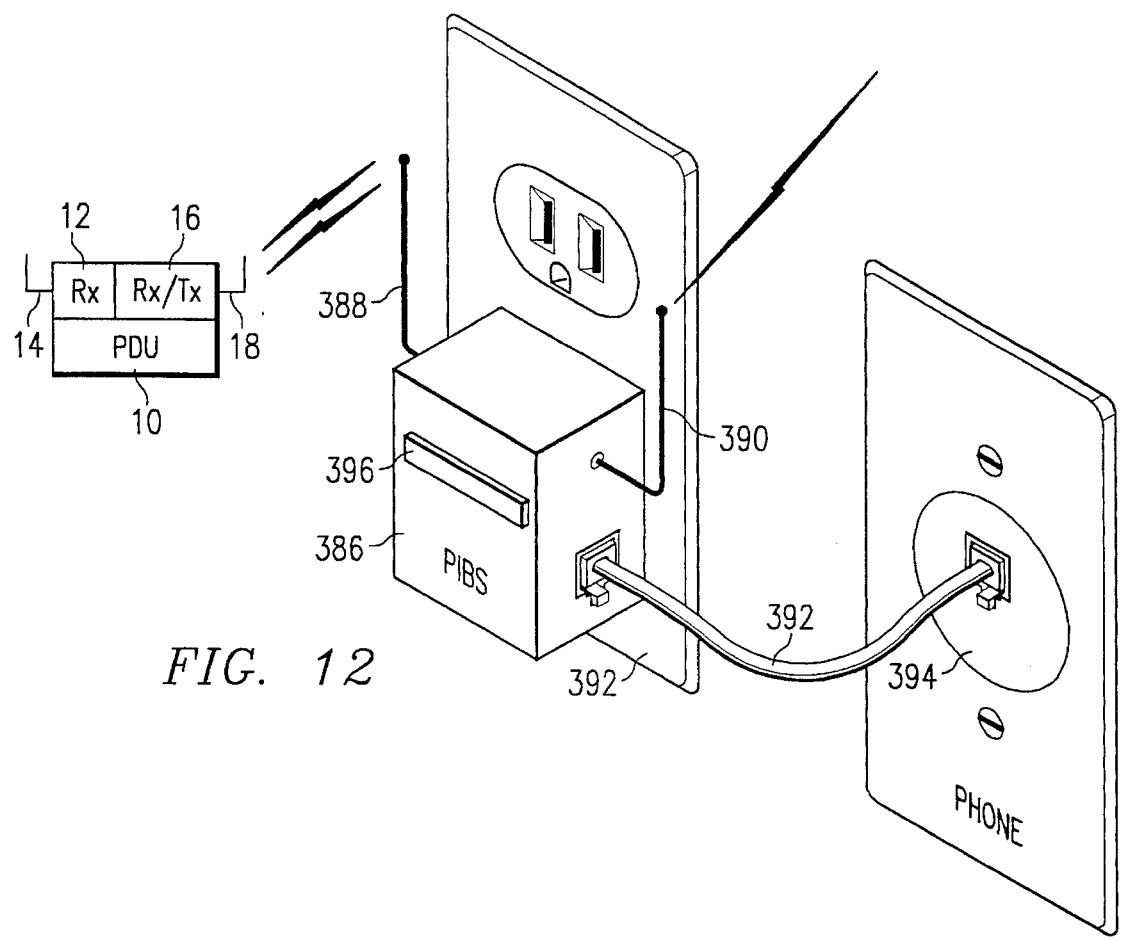
FIG. 12 illustrates an additional embodiment of the present invention.

Referring now to FIG. 12, there is illustrated an additional embodiment of the present invention wherein a Personal Information Base Station (PIBS) 386 is illustrated. The PIBS 386 has an antenna 388 for communicating with the antenna 18 and the Rx/Tx section 16 of the PDU 10 and a paging antenna 390 for communicating with a paging system. The PIBS 386 is operable to be plugged into a wall mounted electrical outlet 392 to receive power therefrom and also is operable to be connected through a phone line 392 to a wall mounted phone jack 394 to provide interconnection with the PSTN 34. The PIBS 386 has associated therewith a transceiver card 396 which is substantially similar to the transceiver module described above with respect to FIG. 10, with the exception that the power amplifier 326 has the transmit output thereof routed through an internal power amplifier (not shown).

Figure 13:
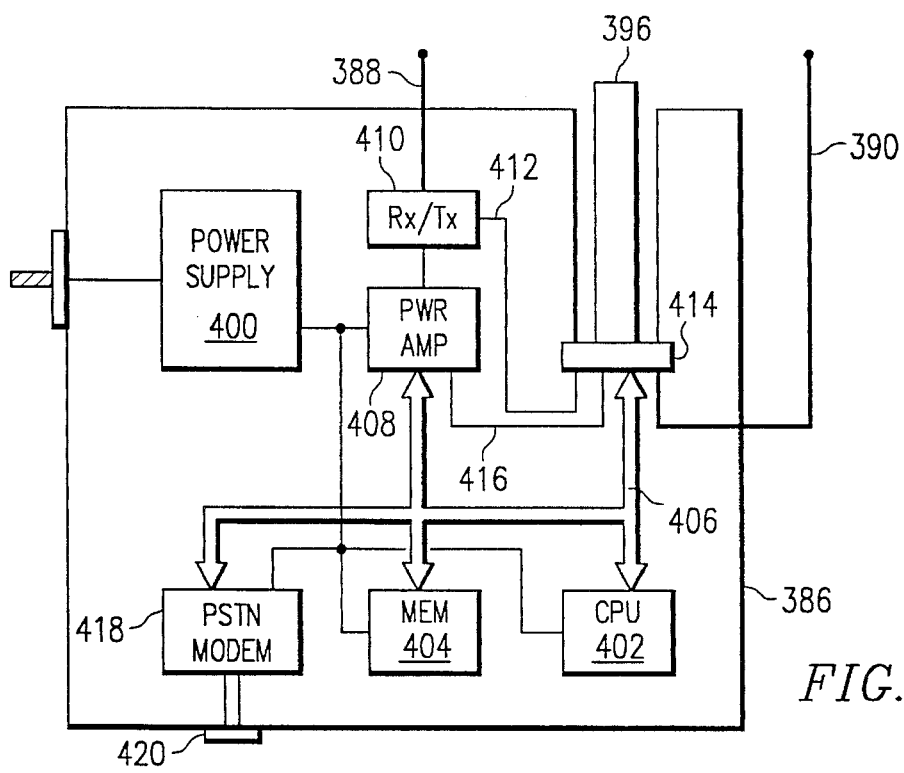
FIG. 13 illustrates a block diagram of the PIBS.

Referring now to FIG. 13, there is illustrated a block diagram of the PIBS 386. A power supply 400 is provided to power the PIBS 386. A central CPU 402 is provided which interfaces with a memory 404 through an address/data bus 406 to execute the various program instructions stored in the memory 404 to operate the overall system. In general, the CPU 402 performs functions similar to the PC 40. The transceiver card 396, as described above, is similar to the circuitry described with respect to the transceiver module of FIG. 10, with the exception that the antenna switch 324 is external to the transceiver card 396. The transmit output of the amplifier 326 is input to a power amplifier 408, which is operable to increase the power of the transceiver module 396. In general, the amplifier 326 only outputs about 100 milliwatts. The power amplifier 408 increases this significantly. The output of the power amplifier 408 is input to a receive/transmit switch (Rx/Tx) 410 which is operable to select the output of the transmitter in a transmit mode, and provide an output to the bandpass filter 342 in a receive mode. The Rx/Tx switch 410 has a receive output 412 connected to an interface socket 414, which also outputs the transmit signal on a Tx output 416. The socket 414 receives the transceiver card 396 and also interfaces with the data/address bus 406. The data/address bus 406 also interfaces with a PSTN modem 418 which is connected to an RJ11 jack 420.

In operation, the PIBS 386 is a portable unit which allows an individual to essentially move the LAN 38 to a remote location and connect it. Thereafter, whenever the PDU 10, for example, wishes to send data, it accesses the nearest LAN, which in this case is the PIBS 386, and then transmits data thereto with a destination PDU 10 defined. The PIBS 386 has disposed in its memory 404 a lookup table and routing information which is then utilized to transfer the data through the PSTN 34 to the homebase LAN 38. This operation is similar to the operation described above with respect to FIG. 1. However, if information is to be sent to the PDU 10, this is difficult since the PIBS 386 is associated with a phone number that is unknown to the rest of the system; that is, this phone number is not stored in the overall system lookup tables. As such, the PIBS 386 must somehow apprise the rest of the system of its location. However, this is difficult since seldom is the phone number of a phone jack known.

An alternate way to send data to the PIBS 386 is to page the PIBS 386 through a paging antenna 390 to inform the PIBS 386 that it wishes to send information thereto, it being known that the PIBS 386 is one of the routing paths for the data to the PDU 10 associated therewith. The PIBS 386 will then access the LAN 38 in accordance with the message information forwarded thereto and retrieve the data therefrom. The PIBS 386 will then attempt to transfer this data to the PDU 10. Alternately, the PIBS 386 could first determine whether the PDU 10 is in its transmit range prior to receiving the data. If not, the PIBS 386 could relay this information back to the requesting LAN 38 over the phone line.

Figure 14:
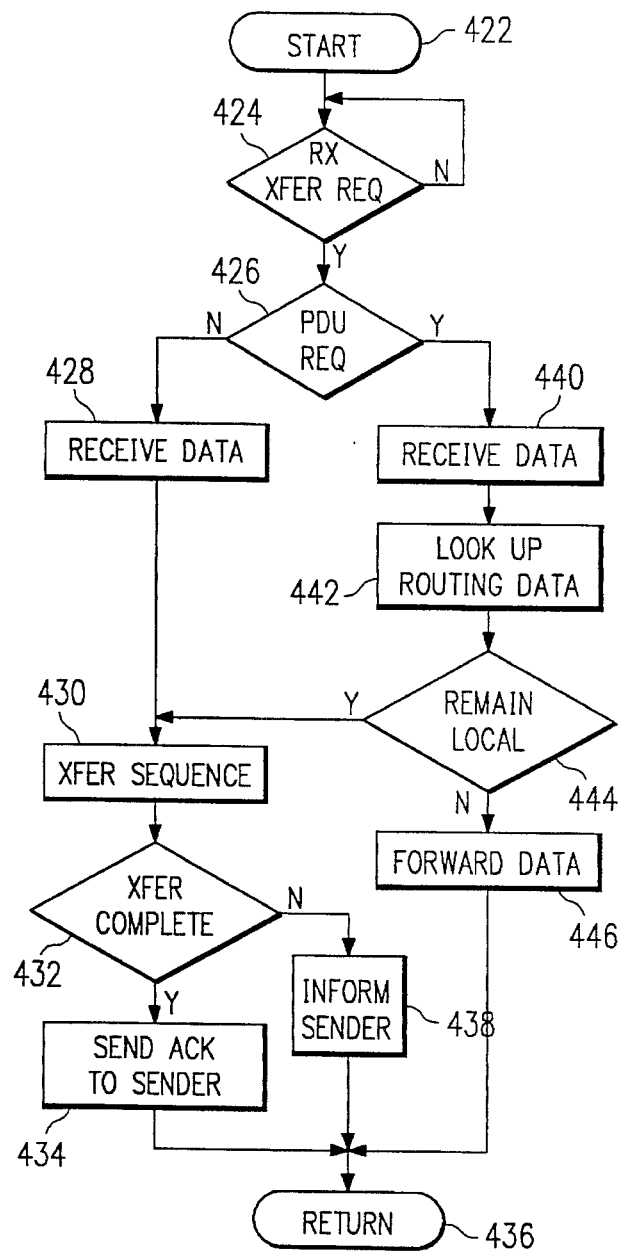
FIG. 14 illustrates a flowchart depicting the operation at the LAN.

Referring now to FIG. 14, there is illustrated a flowchart depicting the operation at the LAN 38. The program is initiated at a start block 422 and then proceeds to a decision block 424 to determine whether a transfer request has been received. The transfer request can be either from the PDU 10 or from another LAN 38. If a transfer request has not been received, the system waits for this request. When it has been received, the program flows to a decision block 426 to determine whether the request has been received from the PDU 10. If not, this indicates that the request has come from another LAN 38 and indicates that data is to be transferred to the LAN 38. The program then flows to a function block 428 to receive the data. The data is preceded by a header, which header indicates the routing information, i.e., which PDU 10 the data is to be routed to. The header is stripped off of the data and the data stored in memory. Thereafter, a message is assembled utilizing this header for transfer of data to the appropriate PDU 10. The program then flows to a function block 430 to initiate a transfer sequence and then to a decision block 432 to determine whether the transfer has been complete. If a transfer is complete, the program flows to a function block 434, which is an optional step that allows an acknowledgement to be sent back to the sender. However, this is not necessary and the program then would flow to a return block 436. If the transfer were not complete, the program would flow from a decision block 432 to a function block 438 to inform the sender that the data could not be delivered and then to a return block 436.

If the request to transfer data was received from one of the PDUs 10, the program would flow from the decision block 426 along the "Y" path thereof to a function block 440 to receive data from the PDU 10. Again, this data is stored in the memory with the header stripped therefrom to allow assembly of a later message. The LAN 38 then looks up the routing data for the destination PDU 10 in the lookup table, as indicated by a function block 442. The program then flows to a decision block 444 to determine whether the destination PDU 10 is local; that is, the receiving LAN is the homebase LAN. If so, the program flows along the "Y" path to the input of the function block 430 to initiate the transfer sequence. However, if the routing information in the lookup table indicates that the destination PDU 10 is not local, the program flows to a function block 446 to forward the data and then to the return block 436.

Referring now to FIG. 15, there is illustrated a flowchart depicting the operation for the transfer sequence, which is initiated at a block 448 and then proceeds to a function block 450 to generate send a "Request-to-Send" message to the destination. The program then flows to a decision block 452 to wait for an acknowledgement signal. If the acknowledgement signal is received, a message is assembled with the destination data and forwarded to the PDU 10 as indicated by function block 454. The program then flows to a decision block 456 to wait for an acknowledgement signal. If the acknowledgement signal is not received, the program flows to a function block 458 to generate an error message, and then to a return block 460. If the acknowledgement signal is received, the program flows directly to the return block from the decision block 456.

If an acknowledgement signal is not received at the decision block 452, the program flows along an "N" path to a decision block 462 to determine if there are additional paths at the LAN available. As described above, the routing table describes a hierarchical order of message delivery. The message may first be sent to the PDU 10 at the homebase LAN, or it can be forwarded to another LAN. Additionally, it could be forwarded via other paths on the LAN, such as through the telephone, etc. If additional paths exist at the LAN, these paths being ones that the LAN can access directly, the program flows along a "Y" path to a function block 464 to obtain the next path and back to the input of function block 450 to again attempt to send the message. In order to flow along a "Y" path from the decision block 462, a communication link must be made with the recipient.

If additional paths do not exist at the LAN, the program flows along an "N" path from decision block 462 to a decision block 466 to determine if another path exists in the routing table. If so, the program flows along a "Y" path to access the recipient LAN, since this is where the data must be transferred in order to access the other path, this being indicated by function block 468. The program then flows to a function block 470 to transfer the data, and then to the return block 460. However, if another path does not exist in the routing table, the program flows along an "N" path from the decision block 466 to a decision block 472 to determine whether the system requires location of the PDU 10 through the paging system. If so, the program flows to a function block 474 to initiate a locate routine, and then to the return block 460. However, if the destination PDU 10 is not to be located, the program flows along an "N" path from decision block 472 to a function block 476 to generate an error message and then back to the return block 460.

Referring now to FIG. 16, there is illustrated a flowchart depicting the locate operation at the LAN, the flowchart being initiated at a function block 480. The program then flows to a function block 482 to assemble the message and transfer this message through the PSTN/PDN 34 to the central station. The program then flows to a decision block 484 to determine whether a Request-to-Transfer message has been received. If not, the program will flow to a function block 486 after a predetermined timeout to generate a "Not Located" signal and then to a return block 488. However, if the Request-to-Transfer has been received, the program will flow to a function block 488 to transfer the data to the requesting party. As described above, this request typically will be received from another LAN at which the destination PDU 10 was located. The destination PDU 10 would send a message to the LAN at Which it was located and this LAN would in turn send a request back to the homebase LAN at which the data was located to request the data. In order to do this, the message forwarded to the paging system indicates the location of the data and the destination PDU merely needs to relay the location of the data to the LAN at which it was located and this LAN can then take over and retrieve the data. After sending the data to the requesting LAN, the program flows to the return block 488.

Referring now to FIG. 17, there is illustrated a flowchart depicting the location operation at the destination PDU 10, which is initiated at a block 488. The program flows to a decision block 490 to determine whether a page has been received. If not, the program enters a Wait mode. However, when a page has been received, the program flows to a decision block 492 to determine whether the message was a Request-to-Send data message. If not, this indicates that this was a straightforward paging message and the program would then flow to a function block 494 to process the message in accordance with the normal POCSAG format and into the return block 496. However, if the message indicated that this was a Request-to-Send data message, the program would flow to a function block 490, wherein the header would be stripped from the message and then a Ready-to-Receive message would be assembled. This is then transferred to the LAN, as indicated by a function block 500. The program then flows to the return block 496.

Figure 18:
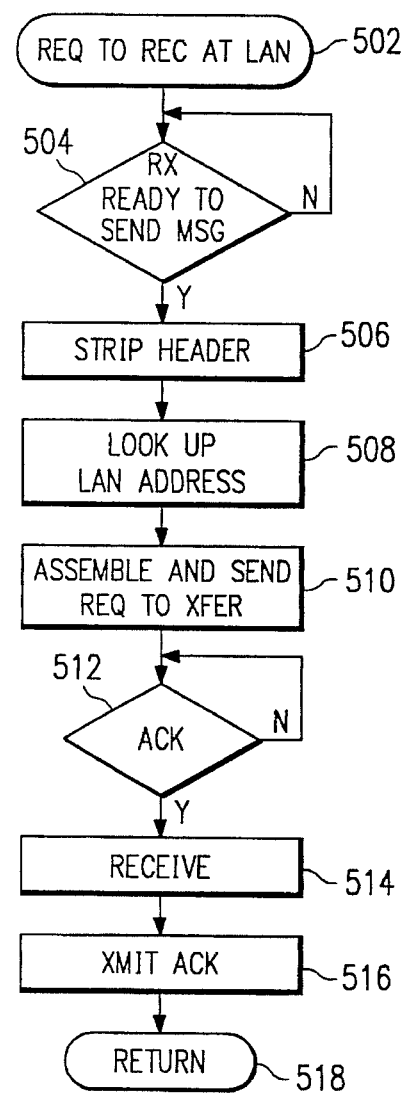
FIG. 18 illustrates a flowchart depicting the operation at the LAN when the Request to Receive message has been received.

Referring now to FIG. 18, there is illustrated a flowchart depicting the operation at the LAN when the Request-to-Receive message has been received. The program is at a block 502 and then proceeds to a decision block 502 and then proceeds to a decision block 504 to determine what the Ready-to-Send message has been received. If so, the program flows to a function block 506 to strip the header from the message and then the LAN address is looked up in the lookup table, as indicated by function block 508. The program then flows to a function block 510 to assemble a Request-to-Transfer message. The Request-to-Transfer message is basically comprised of the address of the destination PDU 10 and the address of the LAN 38 to which data is to be transferred from the original LAN 38, the homebase LAN 38 that initiated the locate sequence. The program then flows to a decision block 5 12 to await an acknowledgement signal from the homebase LAN 38 and then to a function block 5 14 to receive the data and then to a function block 5 16 to transmit an acknowledgement back to the homebase LAN 38. The program then flows to a return block 5 18.

In summary, there has been provided a distributed database system that interacts with a paging system in order to allow distribution of data to wireless remote data terminals. The data is distributed at one of a plurality of LAN based systems, which LAN based systems each have an RF receiver/transmitter that operates over a predetermined range. Each of the wireless data terminals, which are referred to as personal data units (PDU), have associated therewith predetermined routing information which defines the one of the LANs with which it is normally associated and other routing data for allowing the data to be routed to other locations. These locations may be locations at which the PDU is located or at which the owner of the PDU wishes the data to be transferred. When data is to be transferred to a PDU, the LAN at which the PDU is associated, the homebase LAN, has data transferred thereto and then this LAN attempts to transfer the data to the PDU over the wireless communication link. If the PDU cannot be located, a Request-to-Locate message is sent to a paging system and this information is sent on a paging channel to the PDU. When the PDU receives the Request-to-Locate message, it then transmits a Ready-to-Receive message to any one of the LANs that is listening. If another one of the LANs other than the homebase LAN receives this, the receiving LAN transmits a message to the homebase LAN to transfer the data to the receiving LAN, and then the receiving LAN then forwards this data to the PDU over the wireless communication link.

Although the preferred embodiment has been described in detail, it should be understood that various changes, substitutions and alterations can be made therein without departing from the spirit and scope of the invention as defined by the appended claims.

What is claimed is:

1. A method for communicating data with portable data units, comprising the steps of:

providing a plurality of network nodes interconnected by a network communication link, each of the network nodes having a memory associated therewith for storing information and a transmitter associated therewith for transmitting information over a wireless communication link within a predetermined RF range about the associated network node;

providing a receiver at each of the network nodes for receiving over the wireless communication link information from a sending one of the personal data units within the RF range of the associated network node, and storing the received information in the memory of the associated one of the network nodes;

receiving predetermined recipient information for a predetermined recipient portable data unit at one of the network nodes;

locating the one of the network nodes in which transmit range the predetermined recipient portable data unit is disposed, the step of locating comprising the steps of:
  storing predetermined recipient information at one of the network nodes in the associated memory,
  generating a paging message having associated therewith routing information as to which of the network nodes has the predetermined recipient information stored thereat,
  transmitting the paging message over a paging channel that has an RF range substantially greater than the transmit range of each of the network nodes,
  receiving the paging message over the paging channel at the recipient portable data unit,
  generating a Ready-to-Receive message at the recipient portable data unit, the Ready-to-Receive message having associated therewith routing information extracted from the paging message defining the one of the network nodes having the predetermined recipient information stored thereat,
  transmitting the Ready-to-Receive message over the wireless communication link to the one of the network nodes in whose RF range the recipient portable data trait is disposed, and
  the one of the network nodes receiving the Ready-to-Receive message comprising the located the of said network nodes and transmitting a Request-to-Send message to the one of the network nodes at which the predetermined recipient information is stored, indicating that the transmitting network node is the located one of the network nodes;

transferring the predetermined recipient information to the located one of the network nodes for storage in the associated memory thereof, and transferring the stored predetermined recipient information to the predetermined recipient portable data unit from the transmitter associated with the located one of the network nodes over the associated wireless communication link.

2. The method of claim 1, wherein the step of providing a plurality of network nodes comprises providing a plurality of local area networks at each of the network nodes.

3. The method of claim 1, wherein the predetermined recipient information is received from a sending one of the personal data units and is comprised of the predetermined information that is to be sent to the recipient portable data unit and identification information associated with the recipient portable data unit and comprising the steps of:
  generating the predetermined recipient information in association with identification information of the recipient portable data unit as an information packet;
  transmitting the information packet over the wireless communication link to the receiver associated with the one of the network nodes in whose RF range the sending portable data unit is disposed;
  storing the predetermined recipient information received from the sending portable data unit at the receiving network node; and wherein the step of transferring the predetermined recipient information to the recipient portable data unit comprises transferring the predetermined recipient information from the receiving network node to the located one of the network nodes for storage therein and transferring the predetermined recipient information from the located one of the network nodes to the recipient portable data unit.

4. A method for transferring data to portable data units each having a unique address, comprising the steps of:
  providing a plurality of network nodes, each network node serving as a home station for predetermined ones of the portable data units;
  storing in a memory at each of the network nodes a lookup table defining the association between the unique address of each of the portable data units and routing information therefor to the one of the network nodes serving as the home station and storing predetermined recipient information in the associated memory;
  interconnecting the network nodes through a network communication link:,
  transferring the predetermined recipient information designated for a predetermined recipient portable data unit to the one of the network nodes serving as the home station for the recipient portable data unit and storing the recipient information in the associated memory;
  providing at each of the network nodes a transmit/receive circuit for transmitting and receiving data and messages over a wireless communication link having a predetermined RF range about the associated network node, the data and messages transmitted and received between ones of the portable data units within said RF range and the associated transmit/receive circuit;
  transmitting a Request-for-Data Transfer for recipient portable data unit over the RF communication link of the home station network node at which the recipient data is stored;
  transmitting the stored recipient information to the recipient portable data unit in response to an acknowledgment signal being received from the recipient portable data unit indicating that the recipient portable data unit is within the RF range associated with the home station network node;
  locating the one of the network nodes in whose RF range the recipient portable data unit is disposed when the acknowledgment signal is not received by the home station network node after transmitting the Request-for-Data Transfer message; the step of locating comprising the steps of:
    generating a paging message having associated therewith routing information of the home station network node;
    transmitting the paging message over a paging channel that has an RF range substantially greater than the transmit range of each of the network nodes,
    receiving the paging message over the paging channel at the recipient portable data unit;
    generating a Ready-to-Receive message at the recipient portable data unit, the Ready-to-Receive message having associated therewith the home station network node routing information extracted from the paging message,
    transmitting the Ready-to-Receive message over the wireless communication link to the one of the network nodes in whose RF range the recipient portable data unit is disposed, and
    the one of the network nodes receiving the Ready-to-Receive message comprising the located one of said network nodes and transmitting a Request-to-Send message to the home station network node indicating that the transmitting network node is the located one of the network nodes;

transferring the stored recipient information to the located one of the network nodes in which associated RF range the portable data unit is disposed;

transmitting a Request-for-Data Transfer message for reception by the recipient portable data unit from the located one of the network nodes in which associated RF range the portable data unit is disposed; and transmitting the stored recipient data to the recipient portable data unit after receiving an acknowledgment signal therefrom.

5. The method of claim 4 wherein the predetermined recipient information is generated by a sending one of the portable data units and comprising the steps of:

generating at one of the portable data units the recipient data;

generating a Request-to-Send message at the generating one of the portable data units;

transmitting the Request-to-Send message over the RF wireless communication link of the one of the network nodes in whose RF range the generating one of the portable data units is disposed for receipt by the associated network node;

generating and transmitting an acknowledgment signal back to the generating one of the portable data units from the receiving one of the network nodes over the communication link after receipt of the Request-to-Send message;

transmitting the generated recipient information and the unique address of the recipient portable data unit from the generating one of the portable data units to the receiving network node and storing the generated recipient data thereat; and transferring over the network communication link the recipient information received from the generating one of the portable data units and stored at the receiving network node to the home station network node in accordance with routing information stored in the lookup table associated with the receiving network node to the recipient portable data unit in response to an acknowledgement that the recipient portable data unit is within the RF range of the home station network node, and to the located one of the network nodes and then over the wireless communication link associated with the located one of the network nodes when no acknowledgement response is received by the home station network node.

6. A data communications system for communicating data with portable data units, comprising:

a plurality of network nodes interconnected by a network communication link each of said network nodes having a memory associated therewith for storing information and a transmitter associated therewith for transmitting information over a wireless communication link within a predetermined RF range about the one of said network nodes;

a receiver disposed at each of said network nodes for receiving over said wireless communication link information from a sending one of the personal data units within the RF range of the associated network node, the receiving one of said network nodes operable to store the received information in said associated memory;

a location device for locating the one of said network nodes in which transmit RF range a predetermined recipient portable data unit is disposed, said location device comprising:

a storage device for storing predetermined recipient information at one of said network nodes in said memory associated with said one of said network nodes, a paging system for generating a paging message having associated therewith routing information associated with the one of said network nodes having the predetermined recipient information stored thereat, a paging transmitter for transmitting said paging message over a paging channel that has an RF range substantially greater than the transmit range of each of said network nodes, said recipient portable data unit having a receiver associated therewith for receiving said paging message over said paging channel, a processor disposed at said recipient portable data unit for generating a Ready-to-Receive message, said Ready-to-Receive message having associated therewith routing information extracted from said paging message defining the one of said network nodes having said predetermined recipient information stored thereat, a transmitter disposed at said recipient portable unit for transmitting said Ready-to-Receive message over said wireless communication link to the one of said network nodes in whose RF range said recipient portable data unit is disposed, and a network communication device disposed at each of said network nodes, said network communication device disposed at said network node receiving said Ready-to-Receive message from said recipient portable data unit operable to transmit a Request-to-Send message over said network communication link to the one of said network nodes at which said predetermined recipient information is stored, indicating that the transmitting one of said network nodes is the located one of said network nodes;

a first transfer device for transmitting the predetermined recipient information to the located one of said network nodes for store in said associated memory; and a second transfer device for transferring said stored recipient information the located one of said network nodes for store in said associated memory; and a second transfer device for transferring said stored recipient information stored in the located one of said network nodes to the said predetermined recipient portable data unit from said transmitter associated with said located one of said network nodes over said associated wireless communication link.

7. The communicating link of claim 6, wherein said network nodes comprise a local area network.

8. The communication system of claim 6, wherein the predetermined recipient information is received from a sending one of personal data units and is comprised of said predetermined information that is to be sent to said recipient portable data unit and identification information associated with said recipient portable data unit, and further comprising:

a data generation device for generating said predetermined recipient information in association with identification information of said recipient portable data unit as an information packet, said generating device disposed at the sending one of the personal data units;

a portable data unit transmitter disposed at the sending one of the portable data units, said portable data unit transmitter for transmitting said information packet over said wireless communication link to said receiver associated with the one of said network nodes in whose RF range said sending potable data unit is disposed;

said receiving network node operable to store said predetermined recipient information received from the sending one of the portable data units, 9. A communication system for transferring data to portable data units each having a unique address, comprising:

a plurality of network nodes, each of said network nodes serving as a home station network node for predetermined ones of the portable data units;

a memory associated with each of said network nodes and having stored therein a lookup table defining the association between the unique address of each of the portable data units and the routing information therefor to the one of the network nodes serving as a home station network node, said memory operable to store the predetermined recipient information;

a network communication link for interconnecting said network nodes;

a first transfer device for transmitting said stored recipient data designated for a recipient one of the portable data units to the one of said network nodes serving as said home station network node for said recipient portable data unit, said transmitted recipient data stored in the associated memory of said home station network node;

a transmit/receive circuit disposed at each of said network nodes for transmitting and receiving data messages over a wireless communication link having a predetermined RF range about said associated network node, the data and messages transmitted and received between ones of the portable data units within said RF range and the associated transmit/receive circuit;

said transmit/receive circuit disposed at each of said network nodes operable to transmit a Request-for-Data Transfer message for reception by said recipient portable data unit over said wireless communication link of said home station network node at which said recipient data is stored;

said transmit/receive circuit operable to transmit said stored recipient information to said recipient portable data unit after an acknowledgment signal is received from said recipient portable data unit indicating that said recipient portable data unit is within the range associated with said home station network node;

a location device for locating the one of said network nodes in whose RF range said recipient portable data unit is disposed, said location device operable if an acknowledgment signal is not received by said transmit/receive circuit associated with said home station network node after transmitting said Request-for-Data Transfer message, said location device comprising:

a paging system for generating a paging message having associated therewith routing information of the home station network node;

a paging transmitter for transmitting said paging message over a paging channel that has an RF range substantially greater than the transmit range of each of said network nodes, a receiver disposed at said recipient portable data unit for receiving the paging message over the paging channel, a processor disposed at said recipient portable data unit for generating a Ready-to-Receive message, said Ready-to-Receive message having associated therewith the home station network node routing information extracted from said paging message, a transmitter disposed at said recipient portable data unit for transmitting said Ready-to-receive message over said wireless communication link associated with the one of said network nodes in whose RF range said recipient portable data unit is disposed, and the one of the network nodes receiving the Ready-to-Receive message comprising the located one of said network nodes and transmitting a Request-to-Send message to the home station network node indicating that the transmitting network node is the located one of the network nodes;

said location device operable to transfer said stored recipient data from said home station network node to the one of said network nodes in which associated RF range said recipient portable data unit is disposed; and said located one of said network nodes operable to transmit said Request-for-Data Transfer message for reception by said recipient portable data unit over said Wireless communication link of said located one of said network nodes at which said recipient data is stored and then transmit said stored data to said recipient portable data unit after an acknowledgment signal is received from said recipient portable data unit.

10. The communication system of claim 9 wherein at least one of the portable data units can generate the predetermined recipient information and includes:

a processor for generating the predetermined recipient data and a unique address of said recipient portable data units;

a transmitter for transmitting data over the one of said wireless communication links in which the at least one of the potable data units is disposed, said processor operable to generate a Request-to-Send Data message for transmission over said wireless communication link of the one of said network nodes in whose RF range the at least one of the portable data units is disposed, said Request-to-Send message received by the associated one of said network nodes;

a receiver for receiving data and an acknowledgment signal back from the one of said network nodes in whose RF range the at least one of the portable data units is disposed, said acknowledgment signal generated by the one of said network nodes in whose RF range the at least one of the portable data units is disposed after receipt by said network node of said Request-to-Send message; and said processor operable to control said transmitter and transmit said generated recipient information and the unique address of said recipient portable data unit from the at least one of the portable data units to the receiving one of said network node in whose RF range the at least one of the portable data units is disposed, the generated recipient data stored in the memory of said receiving network node.

* * * * *